(12) United States Patent
Nishioka et al.

(10) Patent No.: US 6,401,190 B1
(45) Date of Patent: *Jun. 4, 2002

(54) PARALLEL COMPUTING UNITS HAVING SPECIAL REGISTERS STORING LARGE BIT WIDTHS

(75) Inventors: Kiyokazu Nishioka, Odawara; Kazuhiko Tanaka, Fujisawa; Yoshifumi Fujikawa, Yokohama; Toru Nojiri, Kawasaki; Keiji Kojima, Sagamihara; Koichi Terada, Yokohama; Yoshiki Kurokawa, Chigasaki; Koji Hosoki, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/913,840

(22) PCT Filed: Mar. 15, 1996

(86) PCT No.: PCT/JP96/00673

§ 371 (c)(1),
(2), (4) Date: Sep. 12, 1997

(87) PCT Pub. No.: WO96/29646

PCT Pub. Date: Sep. 26, 1996

(30) Foreign Application Priority Data

Mar. 17, 1995 (JP) ............................................. 7-058790

(51) Int. Cl.[7] .............................................. G06F 15/00
(52) U.S. Cl. ...................................................... 712/24
(58) Field of Search .............................. 712/22, 23, 24

(56) References Cited

U.S. PATENT DOCUMENTS

| 5,057,837 | A | * | 10/1991 | Colwell et al. ................ 341/55 |
| 5,301,340 | A | * | 4/1994 | Cook .......................... 395/800 |
| 5,513,363 | A | * | 4/1996 | Kumar et al. ................ 395/800 |
| 5,530,817 | A | * | 6/1996 | Masubuchi .................. 395/375 |
| 5,574,939 | A | * | 11/1996 | Keckler et al. .............. 395/800 |
| 5,870,618 | A | * | 2/1999 | Fujikawa et al. ....... 395/800.01 |

FOREIGN PATENT DOCUMENTS

| JP | 1-133138 | 5/1989 |
| JP | 4-308930 | 10/1992 |
| JP | 5-143333 | 6/1993 |
| JP | 5-233281 | 9/1993 |
| JP | 63-97833 | 4/1998 |

OTHER PUBLICATIONS

Steven et al., "iHARP: a multiple instruction issue processor", IEE Proceedings, pp. 439–449, 1992.*

Findlay et al., "HARP: A VLIW RISC Processor", IEEE, pp. 368–372, 1991.*

* cited by examiner

Primary Examiner—John A. Follansbee
(74) Attorney, Agent, or Firm—Kenyon & Kenyon

(57) ABSTRACT

An object of the prevent invention is to provide a processor that can execute many computations with a small number of instruction codes. As far as multimedia processing is concerned, a plurality of computations of a same type are often executed concurrently and hence a plurality of computing units having a same function are used and mode information for controlling the plurality of units by an instruction unit for one computing unit is prepared in each instruction to execute a plurality of computations with a single instruction.

2 Claims, 30 Drawing Sheets

FIG. 3

AN EXAMPLE OF A PROGRAM STORAGE INTO THE INSTRUCTION MEMORY

| 0 | | | | | | | 31 |
|---|---|---|---|---|---|---|---|
| HEADER 0 | FIELD 0 | FIELD 1 | FIELD 4 | FIELD 6 | FIELD 7 | FIELD 0 | FIELD 1 |

| 32 | | | | | | | 63 |
|---|---|---|---|---|---|---|---|
| FIELD 2 | FIELD 0 | FIELD 1 | FIELD 2 | FIELD 4 | FIELD 6 | FIELD 7 | FIELD 4 |

| 64   67 | | | | | | | 95 |
|---|---|---|---|---|---|---|---|
| FIELD 7 | HEADER 1 | FIELD 0 | FIELD 1 | FIELD 2 | FIELD 3 | FIELD 6 | FIELD 4 |

1ST INSTRUCTION (ADDRESS NOS. 4~23)
2ND INSTRUCTION (ADDRESS NOS. 24~35)
3RD INSTRUCTION (ADDRESS NOS. 35~59)
4TH INSTRUCTION (ADDRESS NOS. 60~67)
5TH INSTRUCTION (ADDRESS NOS. 72~79)
6TH INSTRUCTION (ADDRESS NOS. 80~87)
7TH INSTRUCTION (ADDRESS NOS. 88~91)
8TH INSTRUCTION (ADDRESS NOS. 92~95)

FIG. 5

HEADER 0

| 0 | | | | | | | 7 | 8 | | | | | | | 15 | 16 | | | | | | | 23 | 24 | | | | | | | 31 |
|---|---|---|---|---|---|---|---|---|---|---|---|---|---|---|---|---|---|---|---|---|---|---|---|---|---|---|---|---|---|---|---|
| 1 | 1 | 0 | 0 | 1 | 0 | 1 | 1 | 1 | 1 | 1 | 0 | 0 | 0 | 0 | 0 | 1 | 1 | 1 | 0 | 1 | 0 | 1 | 1 | 0 | 0 | 0 | 0 | 1 | 0 | 0 | 1 |

1 (n)TH INSTRUCTION FORMAT 0                                            255

| FIELD 0 | FIELD 1 | NOP | NOP | FIELD 4 | NOP | FIELD 6 | FIELD 7 |
|---|---|---|---|---|---|---|---|

2 (n+1)TH INSTRUCTION FORMAT 0                                            255

| FIELD 0 | FIELD 1 | FIELD 2 | NOP | NOP | NOP | NOP | NOP |
|---|---|---|---|---|---|---|---|

3 (n+2)TH INSTRUCTION FORMAT 0                                            255

| FIELD 0 | FIELD 1 | FIELD 2 | NOP | FIELD 4 | NOP | FIELD 6 | FIELD 7 |
|---|---|---|---|---|---|---|---|

4 (n+3)TH INSTRUCTION FORMAT 0                                            255

| NOP | NOP | NOP | NOP | FIELD 4 | NOP | NOP | FIELD 7 |
|---|---|---|---|---|---|---|---|

FIG. 9

AN EXAMPLE OF A PROGRAM STORAGE INTO THE INSTRUCTION MEMORY 0                                                                               31
| HEADER | FIELD 0 | FIELD 1 | FIELD 4 | FIELD 6 | FIELD 7 | FIELD 0 | FIELD 1 |

32                                                                              63
| FIELD 2 | FIELD 0 | FIELD 1 | FIELD 2 | FIELD 3 | FIELD 4 | FIELD 5 | FIELD 6 |

64          72                                                                  95
| FIELD 7 | FIELD 0 | HEADER | FIELD 0 | FIELD 1 | FIELD 2 | FIELD 3 | FIELD 4 |

96                      108                                                     127
| FIELD 5 | FIELD 6 | FIELD 7 | FIELD 1 | FIELD 2 | FIELD 3 | FIELD 0 | FIELD 4 |

FIG. 10

| | T0 | T1 | T2 | T3 | T4 | T5 | T6 | T7 | T8 |
|---|---|---|---|---|---|---|---|---|---|
| INSTRUCTION 1 | IF | EXP | EXE | WB | | | | | |
| INSTRUCTION 2 | | IF | EXP | EXE | WB | | | | |
| INSTRUCTION 3 | | | IF | EXP | EXE | WB | | | |
| INSTRUCTION 4 | | | | IF | EXP | EXE | WB | | |
| INSTRUCTION 5 | | | | | IF | EXP | EXP2 | EXE | WB |
| INSTRUCTION 6 | | | | | | IF | EXP | EXE | |
| REFETCH SIGNAL LINE 13 | 0 | 0 | 0 | 0 | 0 | 0 | 1 | 0 | 0 |
| INSTRUCTION LENGTH SIGNAL LINE 68 | 0 | 24 | 12 | 32 | 4 | 36 | 0 | 12 | 8 |
| INSTRUCTION ADDRESS BUS 64 | 0 | 0 | 24 | 36 | 68 | 72 | 108 | 108 | 120 |
| ADDRESS BUS 3 | 0 | 32 | 56 | 68 | 100 | 104 | 136 | 140 | 152 |
| WRITE ENABLE BUS 43 | 11111111 | 11111100 | 10000011 | 11111111 | 01000000 | 11111111 | 00100000 | 00011100 | 00000011 |

DATA LATCHED IN THE INSTRUCTION BUFFER 40 (INDICATED IN CORRESPONDENCE WITH FIG.9)

| | T0 | T1 | T2 | T3 | T4 | T5 | T6 | T7 | T8 |
|---|---|---|---|---|---|---|---|---|---|
| HEADER ADDRESS BUS 65 | 0 | 0 | 1 | 2 | 3 | 0 | 1 | 1 | 2 |
| FIELD 0 (SELECT SIGNAL 44) | 0 | 1 | 6 | 1 | 1 | 3 | - | - | 6 |
| FIELD 1 | - | 2 | 7 | 2 | - | 4 | - | 3 | - |
| FIELD 2 | - | - | 0 | 3 | - | 5 | - | 4 | - |
| FIELD 3 | - | - | - | 4 | - | 6 | - | 5 | - |
| FIELD 4 | - | 3 | - | 5 | - | 7 | - | - | 7 |
| FIELD 5 | - | - | - | 6 | - | 0 | - | - | - |
| FIELD 6 | - | 4 | - | 7 | - | 1 | - | - | - |
| FIELD 7 | - | 5 | - | 0 | - | - | 2 | - | - |

FIG. 26

| INPUT FIELD | | | OUTPUT FIELD |
|---|---|---|---|
| S MODE | ADDRESS | REGISTER # | REGISTER # |
| 0 | X | N | N |
| 1 | 00 | N | N |
|  | 01 | N | N + 3 |
|  | 10 | N | N + 2 |
|  | 11 | N | N + 1 |

PARALLEL COMPUTING UNITS HAVING SPECIAL REGISTERS STORING LARGE BIT WIDTHS

TECHNICAL FIELD

The present invention relates to a processor suitable for multimedia processing such as digital animation and three-dimensional graphics and, more particularly, to a processing for implementing processing of a high degree of parallelism with a small code size.

BACKGROUND ART

Recently, mainly personal computers and workstations have been increasingly made multimedia compatible. Capabilities mainly required by multimedia include motion picture compression and expansion, voice compression and expansion, three-dimensional graphics processing, and a variety of recognition processing. For voice processing and the like, a DSP (Digital Signal Processor) having performance of several tens of MOPS is conventionally used. However, handling of motion pictures and graphics requires a processor of fairly high performance. For example, motion picture expansion requires performance of about 2 GOPS and its compression requires performance of about 50 GOPS. To satisfy these performance requirements, performance of computing units must be enhanced. Computing unit performance can be enhanced in two approaches; increase of operation frequency and parallel computing.

The former can be achieved comparatively simply but increases the difficulty of packaging design, resulting in increased cost. To implement the performance at a reasonable cost, the latter approach may also be necessary. However, the parallel computing approach presents problems of whether applications are ready for parallelism and that control for effective use of a plurality of computing units is complicated. As for applications, a fairly high parallelism is found as long as multimedia is concerned. For example, 8 computational operations is concurrently executable in motion picture compression.

Approaches for good use of a plurality of computing units include superscalar architecture and VLIW (Very Long Instruction Word). The former is mainly used by general-purpose processors and the scheduling for concurrently executing a plurality of computational operations is performed by these processors. This approach is advantageous in exchangeability of objects with an existing single-processing processor, but at the cost of its extremely complicated hardware because the scheduling is dynamically performed by the processors. On the other hand, VLIW has a problem of compatibility with existing processors but is advantageous in its simplified hardware because no instruction decoder is required.

One of the points of the VLIW hardware simplification is its instruction format. This instruction format is composed of fields for directly controlling computing units, thereby extremely simplifying the control by hardware. A processor having such an instruction format is disclosed in Japanese Non-examined Patent Publication No. Sho 63-98733 "COMPUTER CIRCUIT CONTROL METHOD" for example. In this citation, an operation field indicating that a micro instruction for computation is an instruction for computation and a plurality of control bits for controlling a computing circuit are provided, directly controlling each part of the computing circuit by each of these control bits. Thus, VLIW can implement parallel processing by comparatively simple hardware.

As described, superscalar architecture and VLIW provide effective means for enhancing processing parallelism to draw out performance. In order to fully draw out parallelism, the help of a compiler is indispensable. To be specific, a technique such as loop expansion is known. In this technique, a loop body in a program is duplicated (expanded) a plurality of times and the codes in the expanded loop are scheduled. Namely, increasing the number of instructions to be executed between loop return branches increases the possibility of executing a plurality of instructions concurrently.

The above-mentioned technique duplicates a loop, thereby imposing a problem of increasing code size. A larger code size requires a larger memory capacity in which a program is stored, resulting in increased system cost. In the processors sharing a cache memory, increased code size lowers hit rate, thereby lowering system performance.

Increasing processor parallelism increases the number of computing units. This results in increased circuit scale, thereby increasing the number of development steps. In the computer market mainly dominated by personal computers, well-timed introduction of new products on the market is important in terms of business. To satisfy this requirement, it is important to reduce the number of development steps.

It is therefore an object of the present invention to provide a processor having an architecture for minimizing the code size while enhancing the processing parallelism for enhanced performance.

Another object of the present invention is to provide a processor capable of executing many computational operations by a small number of instruction codes.

Still another object of the present invention is to provide a VLIW processor based on static scheduling.

Yet another object of the present invention is to provide a VLIW processor compatible with various applications and enhanced in the operating ratios of the computing units.

A further object of the present invention is to provide a processor suitable for multimedia processing effective for reducing the instruction code amount of a parallel processor that repeatedly executes computational operations of a same type as with multimedia processing.

A still further object of the present invention is to provide a superscalar processor effective for reducing code size.

A yet further object of the present invention is to provide a processor architecture capable of enhancing processing parallelism while minimizing the number of development steps.

DISCLOSURE OF INVENTION

In order to solve the above-mentioned first problem, the present invention, as long as multimedia processing is concerned, pays attention to that a plurality of computations of a same type are often executed concurrently and prepares mode information for controlling a plurality of computing devices with a single instruction in the instruction format.

For example, in order to execute a plurality of computations with a single instruction by a plurality of computing devices, in a VLIW processor in which one instruction is constituted by a plurality of fields for controlling the computing devices, mode information for controlling the plurality of computing devices is provided in one field. Further, an instruction expansion circuit for generating a plurality of fields from one field in one instruction is provided and the above-mentioned plurality of computing devices are constituted by arranging a plurality of computing devices having a same function.

In a superscalar processor, mode information for simultaneously controlling a plurality of computing devices is provided in one instruction. In addition, an instruction expansion circuit for generating a plurality of instructions from one instruction is provided and a plurality of computing devices having a same function are arranged such that the plurality of generated instructions can be executed concurrently.

In a processor having three or more computing devices, specification information for specifying the computing devices to be executed concurrently is provided and the above-mentioned instruction expansion circuit is provided with a function for generating the required number of instruction fields for the VLIW processor and generating an instruction for the superscalar processor according to the above-mentioned specification information.

In order to solve the above-mentioned second problem, the present invention provides a plurality of computing units constituted by a computing device for concurrently executing a plurality of computations of a same function, an integer computing device for mainly reading an operand to be supplied to this computing device from a memory, and a register file for storing an operand to be used by the above-mentioned two types of computing devices.

Namely, the present invention is a processor having a memory for storing an instruction code, an instructing code holding means for holding a plurality of instruction codes read from said memory, and a plurality of computing units capable of performing computational operations in parallel according to said plurality of instructions codes held in said instruction code holding means, wherein specification information for instructing execution of computations in a plurality of computing units is provided in the instruction code stored in said memory and an analyzing means is provided for analyzing said specification information to determine a plurality of computing devices specified by the instruction code and input said instruction code into a plurality of specified computing units, thereby controlling a plurality of computations in said plurality of computing units with a single instruction code.

Further, the present invention is a processor having a memory for storing an instruction code, an instructing code holding means for holding a plurality of instruction codes read from said memory, and a plurality of computing units capable of performing computational operations in parallel according to said plurality of instructions codes held in said instruction code holding means wherein specification information for instructing execution of computations in a plurality of computing units is provided in the instruction code stored in said memory and an analyzing means is provided for analyzing said specification information to determine a plurality of computing devices specified by the instruction code and input said instruction code into a plurality of specified computing units, thereby executing, in said plurality of computing units, a computation equivalent to a plurality of instructions with a single instruction code in said plurality of computing units.

Still further, the present invention is a processor having a memory for storing an instruction code, an instructing code holding means for holding a plurality of instruction codes read from said memory, and a plurality of computing units capable of performing computational operations in parallel according to said plurality of instructions codes held in said instruction code holding means, wherein, in addition to an ope code for indicating a computation type and an operand, a field for specifying an execution mode as specification information is provided in the instruction code stored in said memory and an analyzing means is provided for analyzing said field and inputting at least the ope code and the operand of the instruction for which said execution mode is enabled into a plurality of computing units, thereby executing computations of similar type in said plurality of computing units.

Yet further, the present invention is a processor having a memory for storing an instruction code, an instructing code holding means for holding a plurality of instruction codes read from said memory, and a plurality of computing units capable of performing computational operations in parallel according to said plurality of instructions codes held in said instruction code holding means, wherein, in addition to an ope code for indicating a computation type and an operand, a field for specifying an execution mode as specification information and a computing unit specification field for specifying the computing unit are provided in the instruction code stored in said memory and an analyzing means is provided for analyzing said fields and inputting at least the ope code and the operand of the instruction for which said execution mode is enabled into the computing unit specified in the computing unit specification field, thereby executing, in said plurality of computing units, the specified computations of similar type.

Moreover, the present invention is the above-mentioned processor, wherein each of said plurality of computing units has a unique register file. In addition, the present invention is the above-mentioned processor, wherein each of said plurality of computing units has a unique register file and the operand field performs register specification in a register file unique to each of said plurality of computing units to make computation data different from each of said plurality of computing units to another. Besides, the present invention is the above-mentioned processor, wherein each of said plurality of computing units has a register file in common.

Further the present invention is the above-mentioned processor, wherein each of said plurality of computing units has a register file in common, has an operand field for specifying a register number from said register file, and adds an offset value unique to the computing unit to be specified to a value of said operand field, thereby making different registers available and enabling computation by different pieces of data.

Still further, the present invention is a processor having a memory for storing an instruction code, an instruction code holding means for holding the instruction code read from said memory, and a plurality of computing units, wherein said instruction code is constituted by a plurality of fields corresponding to said plurality of computing units, control information for controlling a plurality of computing units and field information for each field to specify the corresponding computing unit are provided in any one field in this instruction code, an analyzing means is provided for analyzing said field information and said control information to identify the computing unit to be controlled by said field and inputting said field into this identified computing unit, and one field in said instruction code controls a plurality of computing units, thereby allowing a short instruction code constituted by the number of fields smaller than the above-mentioned computations to execute a plurality of computations.

Yet further, the present invention is a processor having a memory for storing an instruction code, an instruction code holding means for holding the instruction code read from said memory, and a plurality of computing units, wherein said instruction code is constituted by a plurality of fields corresponding to said plurality of computing units, control information indicating that any one field in this instruction code controls a plurality of computing units and header information indicating the number of fields existing in said instruction code are stored in said memory beforehand, an analyzing means is provided for analyzing said header information and said control information to identify the computing unit to be controlled by said field and inputting said field into the identified computing unit, and one field in said instruction code controls a plurality of computing units, thereby allowing a short instruction code constituted by a small number of fields by use of said header information to execute a plurality of computations.

Moreover, the present invention is a processor having a memory for storing an instruction code, an instruction code holding means for holding the instruction code read from said memory, and a plurality of computing units constituted by at least one computing device controlled by information held in said instruction code holding means and a register file for storing operand information of said computing device, wherein said instruction code is constituted by a plurality fields corresponding to the number of computing units, this one instruction code operates a plurality of computing units, and at least one computing device having a same function is provided in all of said computing units, thereby allowing each of all computing units to execute a same computation.

In addition, the present invention is a processor having a memory for storing an instruction code, an instruction code holding means for holding the instruction code read from said memory, and a plurality of computing units constituted by at least one computing device controlled by information held in said instruction code holding means and a register file for storing operand information of said computing device, wherein said instruction code is constituted by a plurality fields corresponding to the number of computing units, at least one computing device having a same function is provided in all of said computing units and a special register for holding a data type having a bit width too large to specify by a register in said register file is provided in each of said computing units, thereby allowing computational processing of both of a data type having a bit width specifiable by a register in said register file and the data type stored in said special data type.

Besides, the present invention is a processor comprising a memory for storing an instruction code having specification information for indicating execution of a plurality of computing units, an analyzing means for analyzing the specification information in the instruction code stored in said memory to determine a plurality of computing units specified by the instruction code, an instruction code holding means for holding an instruction code for specifying the plurality of computing units determined by said analyzing means, and a plurality of computing units for executing computations in parallel according to the instruction code stored in said instruction code holding means.

Further, the present invention is a processor comprising a memory for storing an instruction code having specification information for indicating execution of a plurality of computing units, an analyzing means for analyzing the specification information in the instruction code stored in said memory to determine a plurality of computing units specified by a single instruction code such that a computation equivalent to a plurality of instructions is executed by said single instruction code, an instruction code holding means for holding the single instruction code for specifying the plurality of computing units determined by said analyzing means, and a plurality of computing units for executing computations in parallel according to the single instruction code held in said instruction code holding means.

Still further, the present invention is the above-mentioned processor, wherein each of said plurality of computing units is constituted to execute computations of different types.

Yet further, the present invention is a processor comprising a memory for storing an ope code for indicating a computation type, an operand, and an instruction code having a field for specifying an execution mode as specification information, an analyzing means for analyzing the field in the instruction code read from said memory and inputting at least the ope code and the operand of an instruction for which said execution mode is enabled into a plurality of computing units, an instruction code holding means for holding at the least the ope code and the operand of the instruction inputted by said analyzing means and for which the execution mode is enabled for the plurality of computing units, and a plurality of computing units for executing computations of a same type in parallel according to at least the ope code and the operand held in said instruction code holding means.

Moreover, the present invention is a processor comprising a memory for storing an ope code indicating a computation type, an operand, and an instruction code having a field for specifying an execution mode as specification information and a computing unit specification field for specifying a computing unit, an analyzing means for analyzing the fields read from said memory and inputting at least the ope code and the operand of the instruction for which said execution mode is enabled into the computing unit specified by said computing unit specification field, an instruction code holding means for holding at least the ope code and the operand of the instruction inputted by said analyzing means and for which the execution mode is enabled for the computing unit specified by said computing unit specification field, and a plurality of computing units for executing computations of a same type according to at least the ope code and the operand held in the instruction code holding means.

In addition, the present invention is the above-mentioned processor, wherein each of said plurality of computing units has a unique register file. Besides, the present invention is the above-mentioned processor, wherein each of said plurality of computing units has a unique register file and the operand field performs register specification in a register file unique to each of said plurality of computing units to make computation data different from each of said plurality of computing units to another. Further, the present invention is the above-mentioned processor, wherein each of said plurality of computing units has a register file in common. Still further, the present invention is the above-mentioned processor, wherein each of said plurality of computing units has a register file in common, has an operand field for specifying a register number from said register file, and adds an offset value unique to the computing unit to be specified to a value of said operand field, thereby making different registers available and enabling computation by different pieces of data.

Yet further, the present invention is a processor comprising a memory for storing an instruction code constituted by a plurality of fields corresponding to the number of computing units and, in any one field of said plurality of fields, having control information for controlling a plurality of computing units and field information by which each field specifies the corresponding computing unit, an analyzing means for analyzing the field information and said control information of the instruction code read from said memory to identify the computing unit to be controlled by said field and inputting said field into the identified computing unit, an instruction code holding means for holding said field by said analyzing means, and a plurality of computing units for executing parallel computations according to the field held in said instruction code holding means, wherein one field in said instruction code controls said plurality of computing units, thereby allowing a short instruction code constituted by the number of fields smaller than the above-mentioned computations to execute a plurality of computations.

Moreover, the present invention is a processor comprising a memory for storing an instruction code constituted by a plurality of fields corresponding to the number of computing units and having control information for indicating that any one field of said plurality of fields controls a plurality of computing units and header information for indicating the number of fields existing in said instruction code, an analyzing means for analyzing said header information and said control information read from said memory to identify the computing unit to be controlled by said field and inputting said field into the identified computing unit, an instruction code holding means for holding said field inputted by said analyzing means, and a plurality of computing units for executing parallel computations according to the field held in said instruction code holding means, wherein one field in said instruction code controls said plurality of computing units, thereby allowing a short instruction code constituted by a small number of fields by use of said header information to execute a plurality of computations.

Besides, the present invention is the above-mentioned processor, wherein said analyzing means has an instruction expansion means for reading a compressed instruction code from said memory and converts the compressed instruction code into a directly executable expanded instruction code.

Further, the present invention is the above-mentioned processor, wherein said analyzing means has an instruction expanding means for reading at least one field of a compressed one instruction code from said memory and converting the field into an expanded instruction code composed of a plurality of directly executable fields. Still further, the present invention is the above-mentioned processor, wherein said analyzing means has an instruction buffer for latching a compressed instruction code from said memory, a field controller for analyzing the header information indicating the number of fields existing in said instruction code, and a selector, which corresponds to each field, sorts fields by including presence and absence of each field based on a select signal of the fields analyzed by said field controller and a signal indicating the presence and absence of each field to form expanded fields. Yet further, the present invention is the above-mentioned processor according to claim 16 or 17 or 22 or 23, wherein said analyzing means a SIMD controller for analyzing execution mode (S mode) and SIMD of each field of said instruction code and selectively determining a copy source field of each field and a selector for copying the copy source field selectively determined by said SIMD controller and inputting the copy into each computing unit.

Moreover, the present invention is a processor comprising a memory for storing an instruction code constituted by a plurality of fields corresponding to the number of computing units to operate a plurality of computing units, an instruction code holding means for holding the instruction code read from said memory, and a plurality of computing units constituted by at least one computing device having a same function controlled by information held in said instruction code holding means and a register file for storing operand information of said computing device, wherein said plurality of computing units execute a same computation.

In addition, the present invention is a processor comprising a memory for storing an instruction code constituted by a plurality of fields corresponding to the number of computing units, an instruction code holding means for holding the instruction code read from said memory, and a plurality of computing units constituted by at least one computing device having a same function to be controlled by information held in said instruction code holding means, a register file for storing operand information of said computing device, and a special register for holding a data type having a bit width too large to specify a register in said register file, wherein said plurality of computing units can execute computational processing of both of a data type having a bit width specifiable by the register in said register file and the data type stored in said special register.

Besides, the present invention is a processor having a memory for storing an instruction code and data, an instruction code holding means for a plurality of instruction codes read from said memory, and a plurality of computing units operating in parallel according to the plurality of instruction codes held in said instruction code holding means, wherein each computing unit is constituted by a plurality of computing devices and a plurality of access port register files, each of said plurality of computing devices reads a content of each of said register files from a corresponding access port for computation, and said plurality of computing units have a same function.

Further, the present invention is a processor having a memory for storing an instruction code and data, an instruction code holding means for holding a plurality of instruction codes read from same memory, and a plurality of computing units operating in parallel according to the plurality of instruction codes held in said instruction code holding means, wherein each computing unit is constituted by a plurality of computing devices and a plurality of access port register files, each of said plurality of computing devices reads a content of each of said register files from a corresponding access port for computation, and said plurality of computing units has a subset of a same function.

Still further, the present invention is the above-mentioned processor, wherein at least one computing device in said computing unit can execute a data transfer instruction for transferring data between said memory and said register file.

According to the present invention, if a VLIW processor has eight computing devices, one instruction is constituted by eight fields. One field has operation information, operand information, and the above-mentioned mode information. If this mode information specifies concurrent computation mode for controlling the plurality of computing devices, the remaining seven fields do not exist in the memory at reading an instruction. Consequently, the instruction expansion circuit copies the operation information and the operand information specified in the above-mentioned one field to generate the remaining seven fields. Thus, one instruction equivalent to eight fields is generated with a code size for one field. Because all computing devices have the same function, a plurality of computation instructions become executable in parallel without problem, resulting in the code size compressed to 1/8. Especially, if computing device specification information is set to the mode information, only the field corresponding to this setting information is generated, so that, if the setting information is provided in three bits, the number of concurrent computations can be controlled in a range of two to eight.

If the above-mentioned superscalar processor has four computing devices, one instruction has operation information, operand information, and the above-mentioned mode information. If this mode information specifies concurrent computation mode, the instruction expansion circuit generates the operation information and the operand information specified in the above-mentioned instruction to generate three instructions. Because all computing devices have the same function, a plurality of computation instructions equivalent to four instructions with a code size for one instruction become executable in parallel, resulting in the code size compressed to ¼. Especially, if computing device specification information is set to the mode information, only the instruction corresponding to this setting information is generated, so that, if the setting information is provided in two bits, the number of concurrent computations can be controlled in a range of two to four.

Thus, the present invention can enhance parallelism in concurrent computation processing and reduce the code size to a small extent.

Thus, if the architecture that increases or decreases the processing parallelism on a computing unit basis is employed and a circuit of one computing unit is developed in the development of a processor having two computing units for example, the computing devices for the two computing units can be developed by copying the circuit of this one computing unit. Consequently, the number of development steps of the computing devices for the two computing units becomes generally the same as the number of development steps of the computing devices for one computing unit. If, along with advance in the technology of making chips more microscopic in the future, a highly parallel processing processor such as using four computing units and eight computing units is to be developed, the number of computing device development steps will not increase.

As described before, in multimedia processing, computations of a same type are repetitively executed a plurality of times, so that increasing the processing parallelism surely enhances the performance.

In addition, in one computing unit, the integer computing device can load data to be processed in the next cycle while the multimedia computing device is executing its processing. The loaded data is stored in the register file in the computing unit, the data can be used as an operand to be processed by the multimedia computing device.

Consequently, by employing the software structure in which processing is performed on a computing unit basis, the number of computing units can be adjusted in unit of programs for the computing units. Therefore, if a developed program is migrated to a processor in which the number of computing units has been changed, the number of software development steps involved in a change of the number of computing units can also be decreased.

As described and according to the present invention, not only the number of hardware development steps but also the number of software development steps can be decreased while enhancing the parallelism of processor processing.

BRIEF DESCRIPTION OF DRAWINGS

FIG. 3 is a diagram illustrating an example of storing a program into an instruction memory 1.

FIG. 5 is a diagram illustrating an example of a specific instruction code.

FIG. 9 is a diagram illustrating an example of program storage.

FIG. 10 is a diagram illustrating an operational flow of a program.

FIG. 26 is a diagram illustrating a truth table for implementing the capability of a register adjuster 250.

BEST MODE FOR CARRYING OUT THE INVENTION

Figure 1:
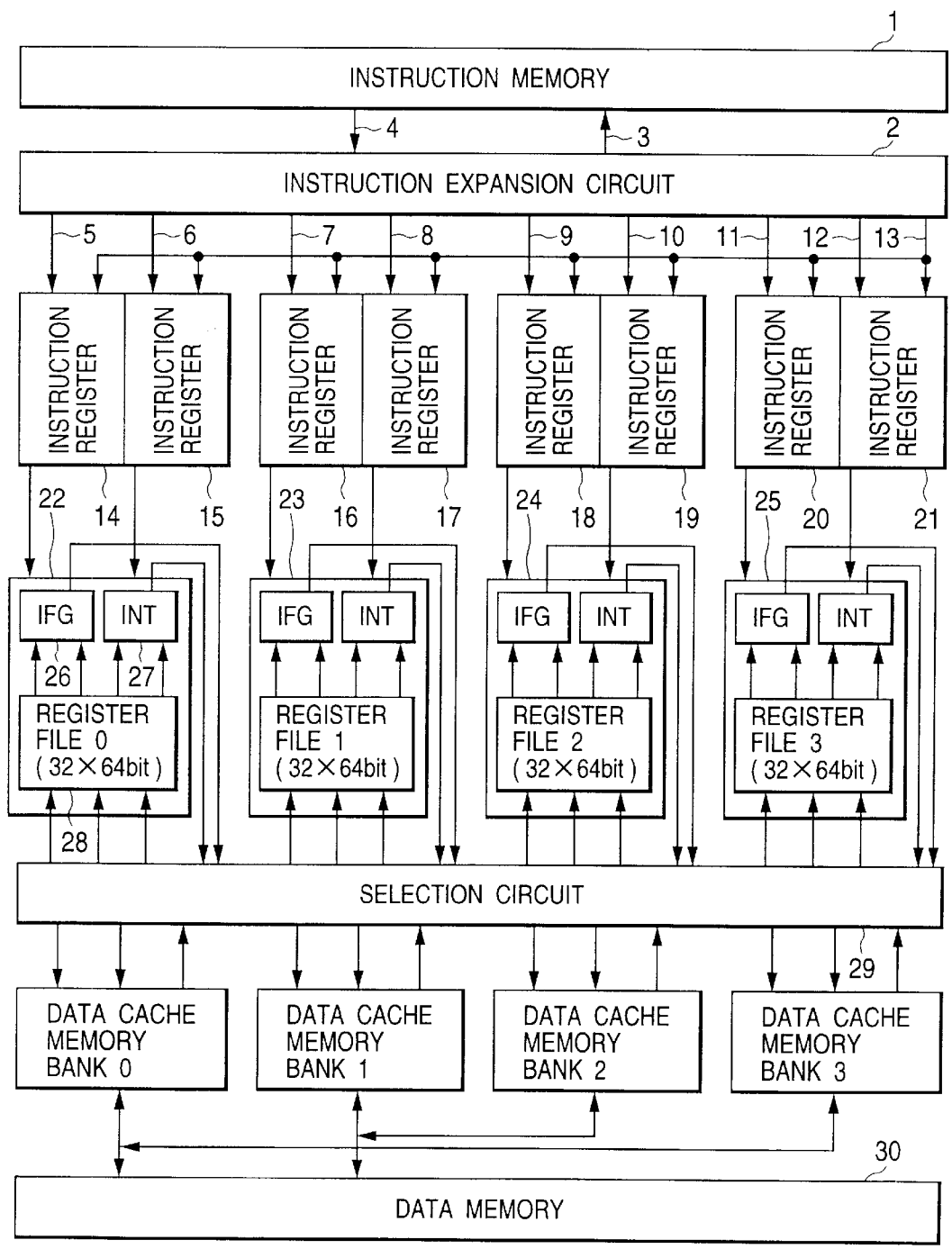
FIG. 1 is a block diagram illustrating a processor practiced as a first embodiment of the invention.

In what follows, the present invention will be described. FIG. 1 is a block diagram illustrating a VLIW processor to which the present invention is applied. In the figure, reference numeral 1 denotes an instruction memory for storing a compressed instruction, reference numeral 2 denotes an instruction expansion circuit, a main block of the present invention, for expanding a compressed instruction code read from the instruction memory 1 into an actually executable code, reference numeral 3 denotes an address bus of the instruction memory 1, reference numeral 4 denotes a data bus of the instruction memory 1, reference numerals 5 through 12 denote field buses to which the instruction expansion circuit 2 output an expanded code, reference numerals 14 through 21 denote instruction registers for holding expanded codes transferred via the field buses 5 through 12, reference numerals 22 through 25 denote computing unit having a same constitution for executing various computational operations according to the expanded codes held in the instruction registers 14 through 21, reference numeral 26 denotes an IFG (Integer Floating Graphics) computing device for executing complicated computational operations such as a multimedia computation operation for which a plurality of operations are performed on an 8-bit or 16-bit basis and a multiplication, reference numeral 27 denotes an INT (Integer) computing device for executing simple computational operations such as a data transfer instruction for executing data transfer between a data memory 30 and a register file and a logic operation, reference numeral 28 denotes a register file for holding a value to be operated and an operation result value, composed of 32 64-bit registers, and having 4 read ports and 3 write ports, reference numeral 29 denotes a selection circuit for transferring operation results of the computing units 22 through 25 to another operation unit, and reference numeral 30 denotes the data memory with which data is transferred with the register files in the computing units 22 through 25.

In this figure, this VLIW processor is formed on a single LSI. Descriptions of a cache memory for temporarily storing instruction codes and so on and LSI terminals for reading instruction codes and so on from outside the processor and outputting operation results to the outside are omitted from the following description.

The present invention features that the computing unit 22 is constituted by the IFG computing device 26, the INT computing device 27, and the register file 28 and the identical computing units 23 through 25 are arranged in parallel.

The following describes the operations as shown in FIG. 1.

In the figure, the instruction expansion circuit 2 reads a compressed instruction code from the instruction memory 1 by address information given via the address bus 3 and converts this instruction to an expanded instruction directly executable by the computing units 22 through 25. An expanded instruction code equivalent to one instruction consists of 8 fields, which are transferred to the corresponding instruction registers 14 through 21. The fields are of two types; IFG field and INT field. The IFG field is transferred to the instruction registers 14, 16, 18, and 20 and the INT field is transferred to the instruction registers 15, 17, 19, and 21.

The IFG field stored in the instruction register 14 controls a computational operation associated with the IFG computing device 26 in the computing unit 22. On the other hand, the INT field stored in the instruction register 15 controls a computational operation associated with the INT computing device in the computing unit 22. Likewise, the instruction registers 16 and 17 control the IFG computing device and the INT computing device in the computing unit 23, the instruction registers 18 and 19 control the IFG computing device and the INT computing device in the computing unit 24, and the registers 20 and 21 control the IFG computing device and the INT computing device in the computing unit 25.

Data to be computed in the IFG computing device 26 and the INT computing device 27 is read from the register file 28. A result of the computation is outputted to the selection circuit 29 and can be written to the register file 28 of any computing unit.

When a data transfer instruction is issued, data is transferred between the register file 28 and the data memory 30 via the selecting circuit 29. Namely, the IFG computing device 26 executes an operating instruction, the data transfer instruction allows the INT operating device 27 to execute an instruction for transferring data to be computed by the IFG computing device 26 from the memory 30 to the register file 28 in a next cycle. The data transferred by the INT computing device 27 to the register file 28 can also be read from the IFG computing device 22, so that the IFG computing device can execute an operating instruction every cycle.

In considering multimedia processing such as image processing, a program structure may be designed in which an area for an image to be processed is divided into four and these four areas are assigned to the four computing units. In this case, since the processing contents in these areas are the same and the functions of the computing units are the same, there is basically one program to be executed in these computing units. Therefore, a program for one computing unit may be developed and the program may also be used by the other three computing units. In the present embodiment, the four computing units are provided; if, along with the advance in semiconductor technology, eight computing units are provided, using a program structure in which an image area to be processed is divided into eight allows one program to be used by the eight computing units, thereby reducing the number of software development steps.

These effects have been obtained, in the multimedia processing such as the above-mentioned image processing, by enhancing the throughput by parallelizing repetitive processing operations by using the fact that repetitive processing of same operations occur frequently. Since the computing units are basically the same in circuit, the number of hardware development steps for the processor composed of these computing units can be reduced.

In the embodiment shown in FIG. 1, the code size can be minimized while enhancing the parallelism of the processing operations to be performed concurrently.

The following describes in detail the field of the expanded instruction code for controlling the computing units 22 through 25.

Figure 2:
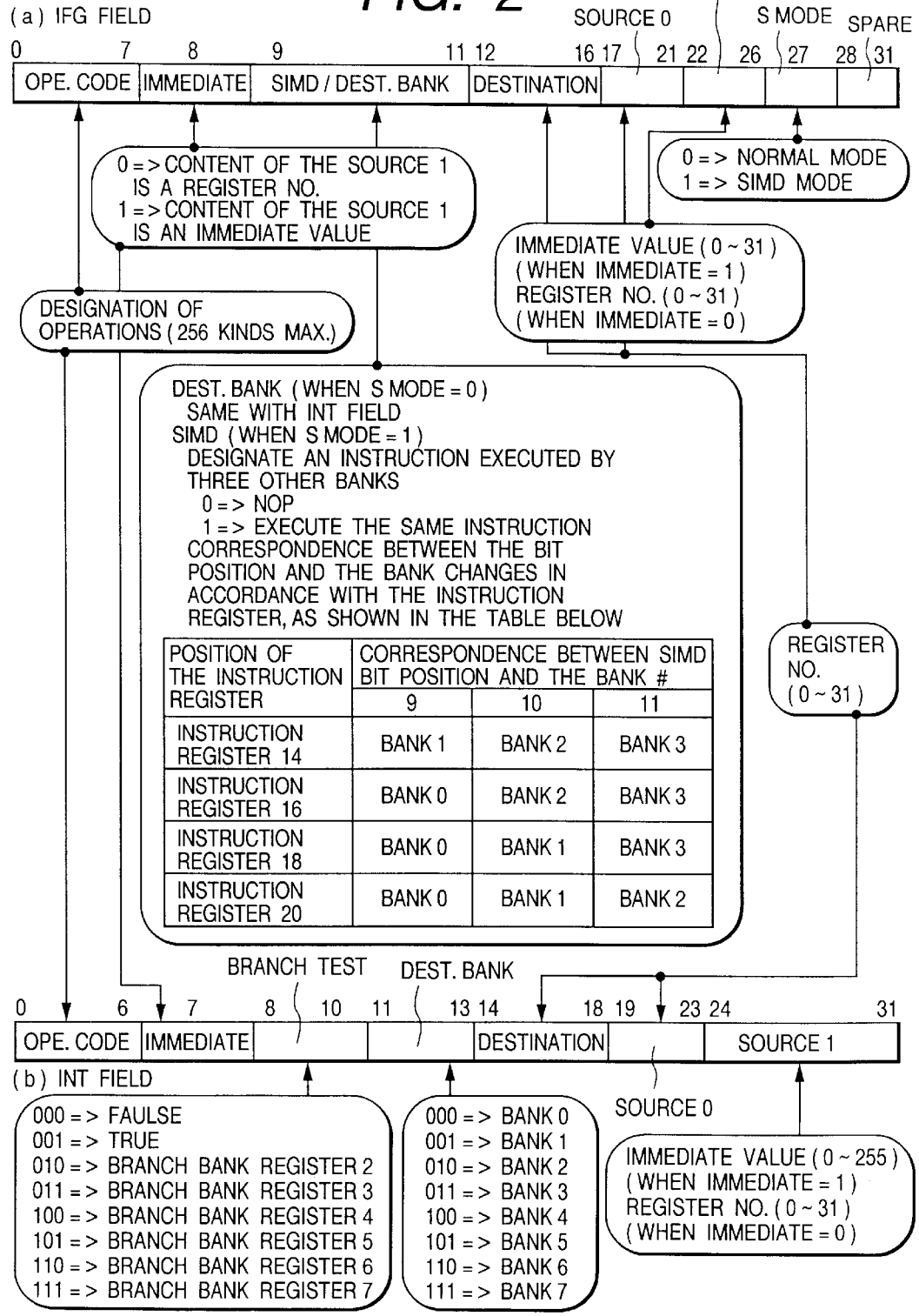
FIG. 2 is a diagram illustrating an instruction format of the processor.

FIG. 2 shows the formats of an IFG field and an INT field.

(1) First, the blocks constituting the IFG field will be described.

An ope code block (hereafter referred to as "ope code") composed of bits 0 through 7 indicates a type of an operation and may specify up to 256 types. When the ope code=0, no operation (NOP) is provided. An immediate block (hereafter referred to as "immediate") indicated by bit 8 denotes the meaning of the content of a source 1 block (hereafter referred to as "source 1") composed of bits 22 through 26; when the immediate is 1, it indicates an immediate value and when the immediate is 0, it indicates a register number. The register number indicates one of the 32 registers in the register file in the computing unit concerned. Likewise, a source 0 block (hereafter referred to as "source 0") composed of bits 17 through 21 indicates one of the 32 registers in the register file in the computing unit concerned.

An S mode block (hereafter referred to as "S mode") (a 1-bit field) indicated by bit 27 specifies a concurrent operation mode, key to the present invention. When this bit ("S mode") is 0, it indicates a normal mode; when this bit is 1, it indicates SIMD (Single Instruction Multiple Data stream) mode (the concurrent operation mode).

An SIMD/test bank block indicated by bits 9 through. 11 is notified as "dest. bank" in the normal mode and "SIMD" in the SIMD mode.

In the normal mode ("S mode" is 0), an operation result of each computing unit can be written to a register of the register file in another computing unit. Therefore, in the normal mode, a computing unit is identified by "dest. bank" and a register in that computing unit is identified by a destination block (hereafter referred to as "destination") composed of bits 12 through 16. The computing unit 22 corresponds to bank 0, the computing unit 23 corresponds to bank 1, the computing unit 24 corresponds to bank 2, and the computing unit 25 corresponds to bank 3. The "destination" can specify 32 register numbers and the dest. bank can specify 8 computing units. The present embodiment is constituted by the four computing units 22 through 25 but the instruction format itself is applicable to a VLIW processor constituted by eight computing units.

On the other hand, in the SIMD mode (when the "S mode" is 1), in order to control the plurality of computing units by a single IFG field, the computational result of each computing unit is written only to a register in the register file in the computing unit concerned. Therefore, in the SIMD mode, the register to which the computational result is written is specified by specifying 32 register numbers by "destination." Further, to specify the other computing units to be operated concurrently, "SIMD" that shares dest. bank and field is used.

"SIMD" is composed of three bits and indicates whether the other three computing units perform a same operation or not. 1 indicates the execution of a same instruction and 0 indicates no execution, namely no operation (hereafter referred to as NOP). The relationship between the three bits and the computing units depends on an instruction register in which the IFG field is held. Namely, if the IFG field is held in the instruction register 14 corresponding to the bank 0, the three bits of "SIMD" correspond to the bank 1, bank 2, and the bank 3. Therefore, if "SIMD" is 110 (binary), a same instruction is set to the instruction registers 14 and 15, 16 and 17, and 18 and 19. If the IFG field is held in the instruction register 18 corresponding to the bank 2, the three bits of "SIMD" correspond to the bank 0, bank 1, and bank 3. If the IFG field is held in the instruction register 20 corresponding to the bank 3, the three bits of "SIMD" correspond to the bank 0, the bank 1, and the bank 2.

It should be noted that "destination," "source 0," and "source 1" constitute an operand.

(2) The following describes the INT field.

The INT field differs from the IFG field in three points. The first difference lies in that one bit of "ope code" is deleted and hence the specifiable number of computational operations is 128. The second difference lies in that the number of bits of "source 1" is increased to eight bits and hence the specifiable number of immediate values is 0 to 255. The last difference lies in that a branch test block (hereafter referred to as "branch test") not provided for the IFG field is added. The "branch test" is for program branch control. Each of the computing units 22 through 25 has six branch bank registers each consisting of one bit for conditional branch. In these registers, 1 indicates branch and 0 indicates no branch. When the "branch test" is 000 (binary), no branch occurs. When it is 001, an unconditional branch occurs. When it is 010 to 111, a branch (a conditional branch) occurs according to the content of a corresponding branch bank register.

The following describes a process of storing instructions constituted by IFG and INT fields into the instruction memory 1. FIG. 3 shows an example of storing a program into the instruction memory 1. In the figure, eight instructions are stored at addresses 0 through 95. The header, information indicating whether each instruction has a field or not, is provided for every four instructions. Fields 0, 1, 2, 3, 4, 5, 6, and 7 correspond to the instruction registers 14, 15, 16, 17, 18, 19, 20 and 21 respectively. No field denotes a field omitted for NOP or the SIMD mode.

In this example, the NOP field is not stored, and the first instruction is constituted by fields 0, 1, 4, 6, and 7, the second instruction by the fields 0, 1, and 2, the third instruction by the fields 0, 1, 2, 4, 6, and 7, the fourth instruction by the fields 4 and 7, the fifth instruction by the fields 0 and 1, the sixth instruction by the fields 2 and 3, the seventh instruction by the field 6, and the eighth instruction by the field 4.

Figure 4:
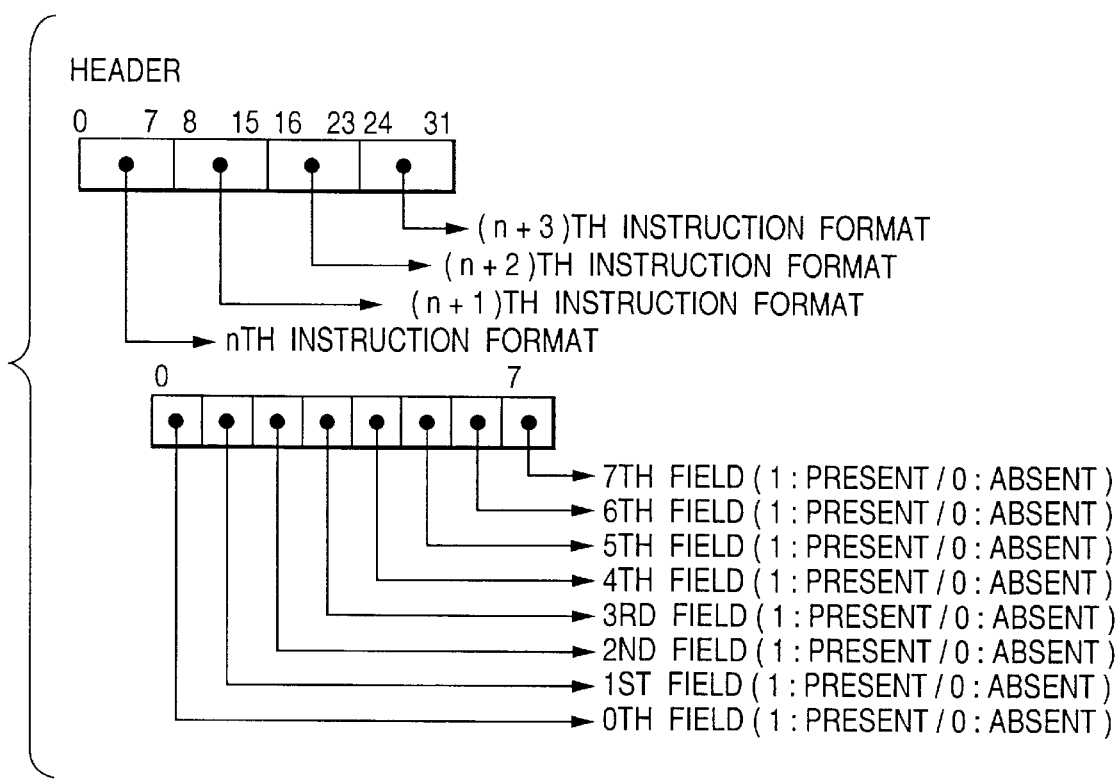
FIG. 4 is a diagram illustrating a format of a header.

The following describes the above-mentioned process in more detail. FIG. 4 shows a format of the header shown in FIG. 3. One header consists of 32 bits, the same size as one field and indicates field present/absent information for four instructions (4×8=32).

As a specific example, FIG. 5 shows the header 0 shown in FIG. 3 and the corresponding expanded instruction formats 1 through 4. It is assumed that these four instructions be all specified with the normal mode. The expanded instruction format is generated by the instruction expansion circuit 2 from the field presence/absence information. In the instruction memory 1, the omitted NOP field is generated and the fields are sorted.

Figure 6:
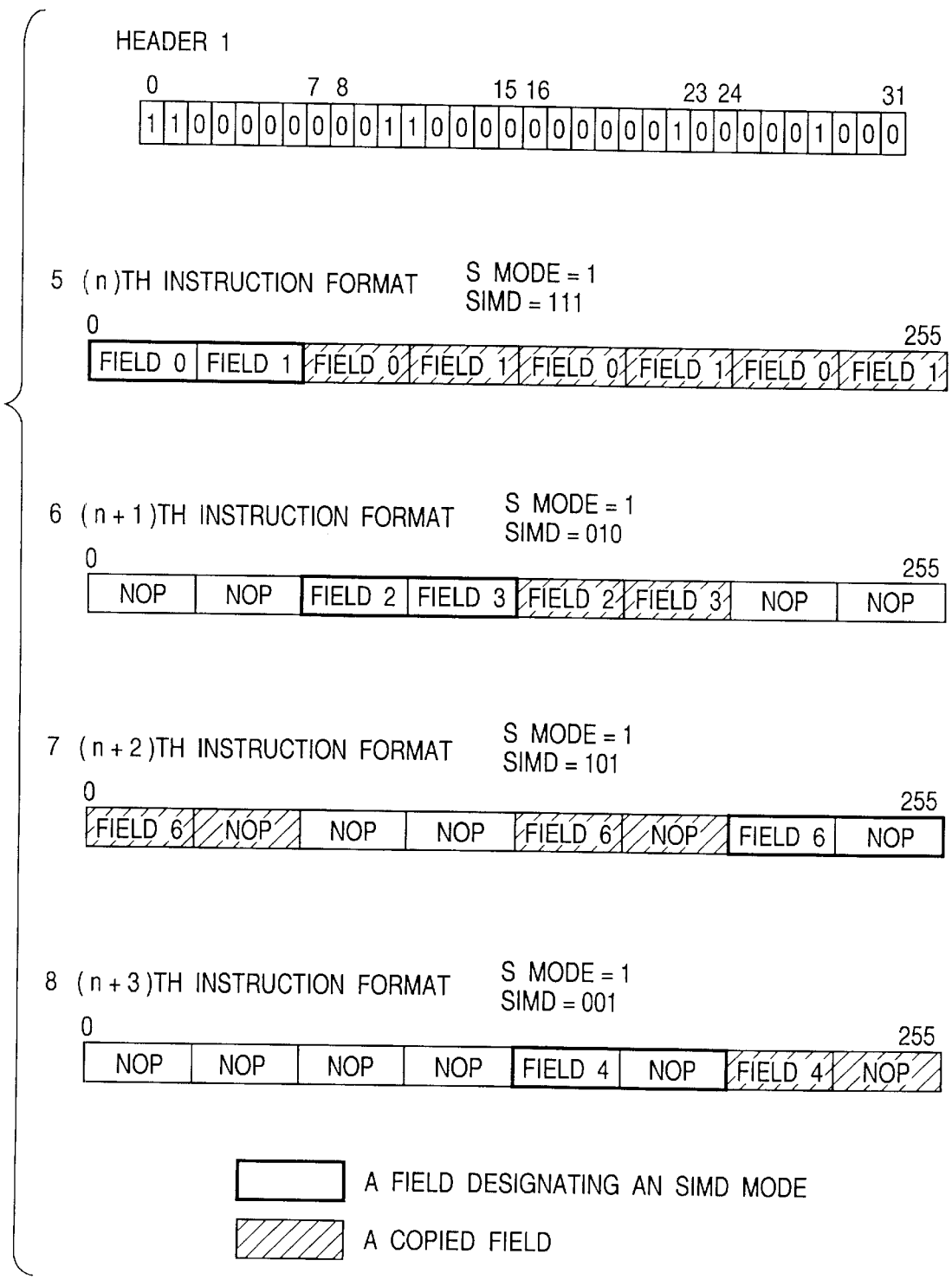
FIG. 6 is a diagram illustrating an example of a specific instruction code.

On the other hand, as a specific example with the SIMD mode specified, FIG. 6 shows the header 1 shown in FIG. 3 and the corresponding expanded instruction formats 5 through 8. It is assumed that "S mode" and "SIMD" of these instructions be preset to the values shown.

In the figure, in the fifth instruction, the SIMD mode is specified by "S mode"=1 in the field 0 and, since "SIMD" is 111, the contents of the fields 0 and 1 are copied to the fields 2 and 3, the fields 4 and 5, and the fields 6 and 7. In the sixth instruction, the SIMD mode is specified by "S mode"=1 in the field 2 and, since "SIMD" is 010, the contents of the fields 2 and 3 are copied to the fields 4 and 5. In the seventh instruction, the SIMD mode is specified by "S mode"=1 in the field 6 and, since the "SIMD" is 101, the contents of the fields 6 and 7 are copied to the fields 0 and 1 and the fields 4 and 5. In the eighth instruction, the SIMD mode is specified in the field 4 and, since "SIMD" is 001 (0=NOP, 1=execute the same instruction), the contents of the fields 4 and 5 are copied to the fields 6 and 7.

So far, the method of expanding compressed instruction codes according to the present invention has been described.

Figure 7:
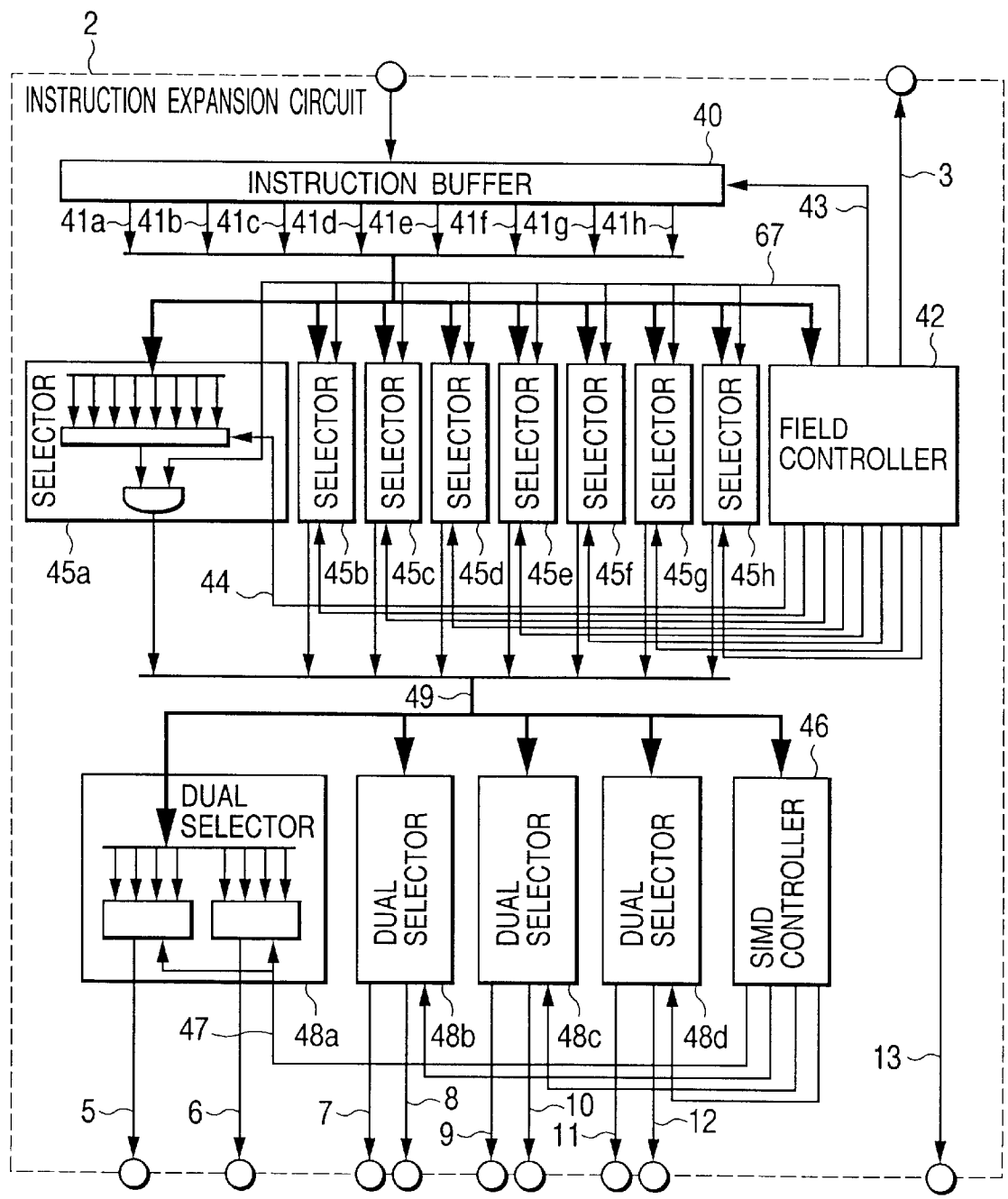
FIG. 7 is a block diagram illustrating an instruction expansion circuit 2 in detail.

The following describes details of the instruction expansion circuit 2 for implementing the above-mentioned method. FIG. 7 is a block diagram illustrating the instruction expansion circuit 2 in detail. With reference to FIG. 7, the circuit blocks and signal lines similar to those previously described with FIG. 1 are denoted by the same reference numerals. Reference numeral 40 denotes an instruction buffer for latching a compressed instruction code (32 bytes) from the data bus 4, reference numeral 41 (41*a* through 41*h*)

denotes a compressed field bus having a constitution of 4-byte (one field or one header)×8, reference numeral 42 denotes a field controller for analyzing header information, reference numeral 43 denotes a write enable bus constituted by eight signals for enable a write operation on a 4-byte basis, reference numeral 44 denotes a field select signal for sorting fields, reference numerals 45a through 45h denote selectors for selecting one of eight 4-byte signals of the compressed field bus 41, reference numeral 67 denotes eight field signal lines indicating presence/absence of the fields 0 through 7, reference numeral 49 denotes an expansion field bus after field sorting, reference numeral 46 denotes an SIMD controller for controlling a field copy operation of each instruction in the SIMD mode, reference numeral 47 denotes a SIMD select signal line for controlling selection of a field to be copied, and reference numeral 48 denotes a dual selector for selecting any two fields (IFG field and INT field).

The following describes the detailed operation. The field controller 42 references information held in the instruction buffer 40 and takes out the header information for analysis. Based on the analysis result, outputs address information of an instruction to be fetched to the instruction buffer 40 to the address bus 3, information for enabling the fetch to the instruction buffer 40 on a 4-byte basis to the write enable bus 43, and information for selecting the field 0 of the instruction from the compressed field bus 41 to the field select signal line 44. Likewise, select information of the fields 1 through 7 is outputted to the selectors 45b through 45h respectively. Information indicating presence/absence of each field is outputted to the field signal line 67.

Because the instruction buffer 40 is 32 bytes long, it cannot hold a longest instruction composes of the header and the eight fields at a time. Therefore, in this case, two fetch operations are required. The field controller 42 outputs information indicating the second fetch to a refetch signal line 13. This signal is sent to the instruction registers 14 through 21 shown in FIG. 1. To be outputted in a refetch cycle is only the information of the field 7, so that, in this cycle, only the instruction register 21 corresponding to the field 7 latches (updates) the field data.

The selector 45a outputs 0 as field information when a signal line corresponding to the field 0 of the field signal line 67 indicates no field. Namely, in the present embodiment, since the ope code=0 is NOP, NOP is outputted. Conversely, if the signal line indicates presence of a field, information of the field 0 is selected from the compressed field bus 41 to be outputted to the expanded field bus 49 according to information of the field select signal line 44. Likewise, the selectors 45b through 45h corresponding to the other fields select these fields to output the corresponding information to the expanded field bus 49 according to the information coming from the field controller 42. Thus, to the expanded field bus 49, the expanded and sorted instruction codes are outputted.

The SIMD controller 46 analyzes "S mode" and "SIMD" of the fields 0, 2, 4, and 6 in the expanded field bus 49, determines the copy source field of each of these fields, and outputs information for selecting the copy source field to the dual selector 48a.

In the normal mode, the SIMD controller 46 outputs select information for selecting the copy source field 0 and 1 to the dual selector 48a. According to this select information, the dual selector 48a selects two of the eight fields in the expanded field bus 49 and outputs the field 0 to the field bus 5 and the field 1 to the field bus 6.

Likewise, information for selecting the copy source fields for the fields 2 and 3, the fields 4 and 5, and the fields 6 and 7 is outputted to the corresponding dual selectors 48b through *d*. Each the dual selectors 48b through *d* select two of the eight fields in the expanded field bus 49 and outputs the field 2 to the field bus 7, the field 3 to the field bus 8, the field 4 to the field bus 9, the field 5 to the field bus 10, the field 6 to the field bus 11, and the field 7 to the field bus 12. Thus, in the SIMD mode, according to the information specified in each instruction, the content of a particular field can be copied to another field. This allows may computational operations with a small number of instructions.

The following describes the operation of the first instruction shown in the example of FIG. 3, by way of example. The instruction buffer 40 holds the header 0 through the field 1 of the second instruction. From this state, the selector 45a to h corresponding to each field generates the first instruction format shown in FIG. 5 according to the analysis information of the header 0 in the field controller 42 and outputs the generated instruction format to the expanded field bus 49.

In doing so, the field controller 42 outputs information for fetching a next instruction to a total of 24 bytes of the header 0 and the five fields equivalent to the first instruction in the instruction buffer 40 to the write enable bus 43. The information to be outputted to the write enable bus 43 is composed of eight bits to control a write operation to be performed at each 4-byte boundary.

On the other hand, the address information of the address bus 3 indicates a beginning (the field 0 of the second instruction shown in FIG. 3) of the next instruction and data composed of 32 bytes (address 24 through address 55) continued from its address is outputted to the data bus 4. In this state, in the next cycle, according to the above-mentioned information of write enable bus 43, the data for 24 bytes (address 32 through address 55) is updated. Consequently, the instruction buffer 40 holds information for 32 bytes at address 32 through address 55 and address 24 through address 31. From this state, the selector 45a through *h* corresponding to each field generates the second instruction format shown in FIG. 5 according to the analysis information of the header 0 in the field controller 42 and outputs the generated instruction format to the expanded field bus 49.

In doing so, the field controller 42 transfers information for fetching a total of 12 bytes for the three fields equivalent to the second instruction to the instruction buffer 40 to the write enable bus 43. On the other hand, the address information of the address bus 3 indicates the beginning (the field 0 of the third instruction shown in FIG. 3) of the next instruction and data composed of 32 bytes (at address 36 through address 67) continued from its address is read to the data bus 4. In this state, in the next cycle, according to the above-mentioned information of write enable bus 43, the data for 12 bytes (address 56 through address 67) is updated. Consequently, the instruction buffer 40 holds information for 32 bytes at address 64 through address 67 and address 36 through address 63. Thus, the field controller 42 performs control via the address bus 3 and the write enable bus 42 such that the instruction buffer 40 is always filled up with data. The details of this field controller 42 will be described later.

"S-mode" of each field on the expanded field bus 49 thus generated is checked in the SIMD controller 46. If the "S-mode" bit is found valid, the SIMD controller 46 identifies a field from which copy is made and a field to which copy is made as shown in FIG. 6.

For example, if copy is made to the fields 0 and 1, field select information of a copy source field is sent to the dual selector 48*a* via the SIMD select signal line 47. If the fields 0 and 1 are the copy source in the normal mode (when "S-mode"=0) or in the SIMD mode (when "S-mode"=1), the field select information selects its own fields, namely the fields 0 and 1. Likewise, the field select information for the fields 2 and 3, the fields 4 and 5, and the fields 6 and 7 is sent to the corresponding dual selector 48*b* to *d*.

The field buses 5 and 6 are outputted from the dual selector 48*a*, the field 0 of the field bus 5 is selected from the fields 0, 2, 4, and 6 of the expanded field bus 49, and the field 1 of the field bus 6 is selected from the fields 1, 3, 5, and 7 of the expanded field bus 49. Likewise, the fields 2 through 7 on the field buses 7 through 12 are generated. The details of this SIMD controller 46 will be described later.

The following describes the detailed constitutions of the field controller 42 and the SIMD controller 46.

Figure 8:
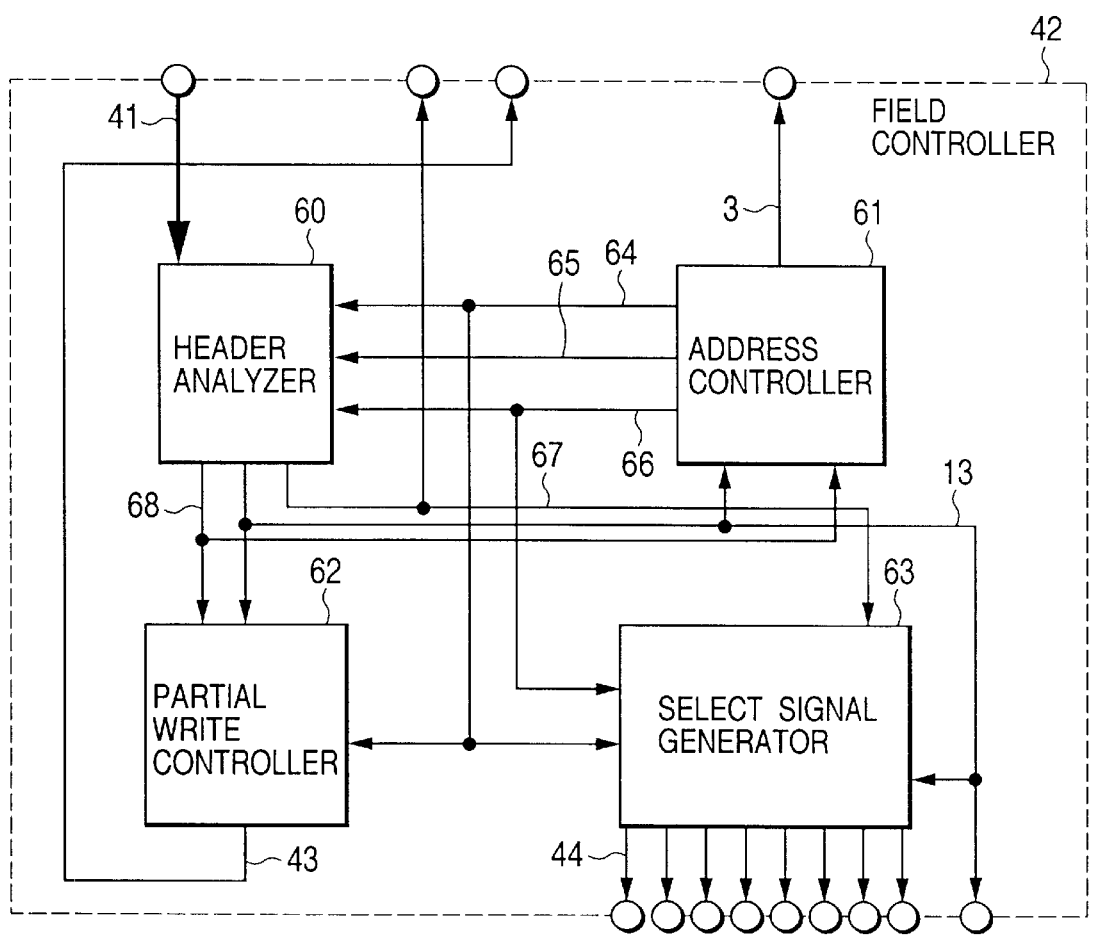
FIG. 8 is block diagram illustrating a field controller 42 in detail.

First, the detailed constitution of the field controller 42 is shown in FIG. 8. In the figure, the circuit blocks and signal lines similar to those previously described with FIG. 7 are denoted by the same reference numerals. In the figure, reference numeral 60 denotes a header analyzer for analyzing header information, reference numeral 67 denotes an 8-bit field signal line indicating the field constitution in the header, reference numeral 68 denotes a 6-bit instruction length signal line indicating an instruction length (0 to 33) at compression, reference numeral 61 denotes an address controller for generating address information to be given to the address bus 3, reference numeral 64 denotes an instruction address bus for transferring instruction address information in execution, reference numeral 65 denotes a 2-bit header address bus indicating one of the four instructions included in the header, reference numeral 66 denotes a header 0 signal line that is asserted when the header address is 0, reference numeral 62 denotes a partial write controller for generating fetch information to be given to the write enable bus 43, and reference numeral 63 denotes a select signal generator for generating field select information to be given to the field select signal line 44 and so on. The following describes the operation of the field controller by using a specific example.

FIG. 9 shows an instruction sequence stored in the instruction memory 1. In this example, seven instructions are stored at addresses 0 through 127.

FIG. 10 shows a timing chart for describing the operations for sequentially executing these instructions. In the figure, the operations during nine cycles of T0 to T8 are shown. Each instruction is basically executed by a 4-stage pipeline. The four stages are IF, which is an instruction fetch stage, EXP, which is an instruction expansion stage, EXE, which is an operation execution stage, and WB, which is an operation result write stage. This figure shows the timing chart for instruction 1 through instruction 6.

First, the instruction 1 will be described. The instruction 1 starts from the initial state and each signal line in T0 cycle indicates an initial value. Because the instruction address bus 64 is 0, address 0 through address 31 are read from the instruction memory 1. Further, the write enable bus 43 is 11111111 (binary) and address 0 through address 31 are latched to the instruction buffer 40 when transition is made from T0 to T1 cycle.

In T1 cycle, the EXP stage of the instruction 1 is executed.

To be more specific, according to the information inputted from the instruction address bus 64 and the header address bus 65, the header analyzer 60 identifies the header information from the information inputted from the compressed field bus 41 and latched in the instruction buffer 40. Namely, because the instruction address bus 64 is 0, the header of the instructions 1 through 4 is found at addresses 0 through 3, and this 4-byte information is latched. Further, because the header address bus 65 is 0, the header information corresponding to the instruction 1 is found to be the eight bits at address 0.

From this information, the header analyzer 60 finds that the instruction 1 consists of five fields 0, 1, 4, 6, and 7. Consequently, the header information 11001011 (binary) of the instruction 1 is outputted to the field signal line 67 without change. Further, the instruction 1 is 24 bytes long including the header and information 011000 (binary) indicating 24 is outputted to the instruction length signal line 68. Because the instruction length is not in excess of 32, the refetch signal line is not asserted.

In other cycles than the initial cycle, the address controller 61 outputs a value obtained by adding 32 to the value of the instruction address bus 64 to the address bus 3. Therefore, in T1 cycle, 32 is outputted to the address bus 3.

From the information of the instruction length signal line 68 and the instruction address bus 64, the partial write controller 62 outputs positional information of the field of the instruction 1 held in the instruction buffer 40 to the write enable bus 43. This positional information is controlled on a 4-bit basis and composed of eight bits. In T2 cycle, the instruction address bus 64 is 0 and the instruction length signal bus 68 is 24, so that the 24 bytes from the beginning of the instruction buffer 40 correspond to the instruction 1 and 11111100 (binary) is outputted to the write enable bus 43.

From the instruction address bus 64, the header 0 signal line 66, and the field signal line 67, the select signal generator 63 generates information for selecting each field information from the instruction buffer 40 and outputs the selected information. For example, the select information of the field 0 is outputted to the field select signal line 44. Likewise, the select information of the fields 1 through 7 is outputted to the corresponding field select signal lines. The select information consists of three bits for indicating from which of the 4-byte boundary positions the read operation is performed in the instruction buffer 40. Since in T1 cycle the instruction address bus 64 is 0 and the header 0 signal line 66 is asserted, it is found that the field of the instruction 1 is held subsequent to the second 32-bit boundary in the instruction buffer 40. Further, which field exists is known from the information of the field signal line 67. Therefore, it is found that, at the second 32-bit boundary, the field 0 is held and select information indicating the field 0 becomes 1, which is outputted to the field select signal 44. Likewise, the select information indicating the field 1 becomes 2, the select information indicating the field 4 becomes 3, the select information indicating the field 6 becomes 4, and the select information indicating the field 7 becomes 5.

Because the address bus 3 is 32 and the write enable bus 43 is 11111100 (binary) at transition from T1 to T2 cycle, address 32 through address 55 are newly latched in the instruction buffer 40 and the already held information of address 24 through address 31 is kept held without change. At the same time, because the instruction length signal line 68 is 24, the information of the instruction address bus 64 becomes 24 by adding 24 to 0 and the information of the header address bus 65 becomes 1 by adding 1 thereto.

Next, as for the instruction 2, the above-mentioned T1 cycle becomes the IF stage and, in T2 cycle, the instruction 2 is held in the instruction buffer 40. In T2 cycle, the EXP stage of the instruction 2 is executed.

To be more specific, because the header address bus 65 is 1, the header analyzer 60 finds that the header information corresponding to the instruction 2 is the eight bits of address 1 of the information latched in T1 cycle. From this information, the header analyzer 60 finds that the instruction 2 consists of three fields 0, 1, and 2. Therefore, the header information 11100000 (binary) of the instruction 2 is outputted to the field signal line 67 without change. Further, the instruction 2 is 12-byte long and information of 001100 (binary) indicating 24 is outputted to the instruction length signal line 68. Because the instruction length is not in excess of 32, the refetch signal line 13 is not asserted.

In other cycles than the initial cycle, the address controller 61 outputs a value obtained by adding 32 to the value of the instruction address bus 64 to the address bus 3. Therefore, in T2 cycle, 56 is outputted to the address bus 3.

Because the instruction address bus 64 is 24 and the instruction length signal line 68 is 12 in T2 cycle, the partial write controller 62 finds that the three bytes from the seventh 4-byte boundary in the instruction buffer 40 correspond to the instruction 2 and 10000011 (binary) is outputted to the write enable bus 43. This positional information is controlled on a 4-bit basis and composed of eight bits.

Because the instruction address bus 64 is 24 and the header 0 signal line 66 is not asserted in T2 cycle, the select signal generator 63 finds that the field of the instruction 2 is held subsequent to the seventh 32-bit boundary in the instruction buffer 40. Further, which field exists is known from the information of the field signal line 67. Therefore, it is found that, at the seventh 32-bit boundary, the field 0 is held and select information indicating the field 0 becomes 6, which is outputted to the field select signal 44. Likewise, the select information indicating the field 1 becomes 7 and the select information indicating the field 2 becomes 0.

Because the address bus 3 is 56 and the write enable bus 43 is 10000011 (binary) at transition from T2 to T3 cycle, address 56 through address 67 are newly latched in the instruction buffer 40 and the already held information of address 36 through address 55 is kept held without change. At the same time, because the instruction length signal line 68 is 12, the information of the instruction address bus 64 becomes 36 by adding 12 to 24 and the information of the header address bus 65 becomes 2 by adding 1 thereto.

As for the instruction 3, the above-mentioned T2 cycle becomes the IF stage and, in T3 cycle, the instruction 3 is held in the instruction buffer 40. In T3 cycle, the EXP stage of the instruction 3 is executed.

To be more specific, because the header address bus 65 is 2, the header analyzer 60 finds that the header information corresponding to the instruction 3 is the eight bits of address 2 of the information latched in T1 cycle. From this information, the header analyzer 60 finds that the instruction 3 consists of eight fields 0, 1, 2, 3, 4, 5, 6, and 7. Therefore, the header information 11111111 (binary) of the instruction 3 is outputted to the field signal line 67 without change. Further, the instruction 3 is 32-byte long and information of 100000 (binary) indicating 32 is outputted to the instruction length signal line 68. Because the instruction length is not in excess of 32, the refetch signal line 13 is not asserted.

In other cycles than the initial cycle, the address controller 61 outputs a value obtained by adding 32 to the value of the instruction address bus 64 to the address bus 3. Therefore, in T3 cycle, 68 is outputted to the address bus 3. Because the instruction address bus 64 is 36 and the instruction length signal line 68 is 32 in T3 cycle, the partial write controller 62 finds that the 32 bytes from the second 4-byte boundary in the instruction buffer 40 correspond to the instruction 3 and 11111111 (binary) is outputted to the write enable bus 43.

Because the instruction address 64 is 36 and the header 0 signal line 66 is not asserted in T3 cycle, the select signal generator 63 finds that the field of the instruction 3 is held subsequent to the second 32-bit boundary in the instruction buffer 40. Further, which field exists is known from the information of the field signal line 67. Therefore, it is found that, at the second 32-bit boundary, the field 0 is held and select information indicating the field 0 becomes 1, which is outputted to the field select signal 44. Likewise, the select information indicating the field 1 becomes 2, the select information indicating the field 2 becomes 3, the select information indicating the field 3 becomes 4, the select information indicating the field 4 becomes 5, the select information indicating the field 5 becomes 6, the select information indicating the field 6 becomes 7, and the select information indicating the field 7 becomes 0.

Because the address bus 3 is 68 and the write enable bus 43 is 11111111 (binary) at transition from T3 to T4 cycle, address 68 through address 99 are newly latched in the instruction buffer 40. At the same time, because the instruction length signal line 68 is 32, the information of the instruction address bus 64 becomes 68 by adding 32 to 36 and the information of the header address bus 65 becomes 3 by adding 1 thereto.

As for the instruction 4, the above-mentioned T3 cycle becomes the IF stage and, in T4 cycle, the instruction 4 is held in the instruction buffer 40. In T4 cycle, the EXP stage of the instruction 4 is executed.

To be more specific, because the header address bus 65 is 3, the header analyzer 60 finds that the header information corresponding to the instruction 4 is the eight bits of address 3 of the information latched in T1 cycle. From this information, the header analyzer 60 finds that the instruction 4 consists of one field 0. Therefore, the header information 10000000 (binary notation) of the instruction 4 is outputted to the field signal line 67 without change. Further, the instruction 4 is 4-byte long and information of 000100 (binary) indicating 4 is outputted to the instruction length signal line 68. Because the instruction length is not in excess of 32, the refetch signal line 13 is not asserted.

In other cycles than the initial cycle, the address controller 61 outputs a value obtained by adding 32 to the value of the instruction address bus 64 to the address bus 3. Therefore, in T4 cycle, 100 is outputted to the address bus 3.

Because the instruction address bus 64 is 68 and the instruction length signal line 68 is 4 in T4 cycle, the partial write controller 62 finds that the four bytes from the second 4-byte boundary in the instruction buffer 40 correspond to the instruction 4 and 01000000 (binary) is outputted to the write enable bus 43.

Because the instruction address 64 is 68 and the header 0 signal line 66 is not asserted in T4 cycle, the select signal generator 63 finds that the field of the instruction 4 is held subsequent to the second 32-bit boundary in the instruction buffer 40. Further, which field exists is known from the information of the field signal line 67. Therefore, it is found that, at the second 32-bit boundary, the field 0 is held and select information indicating the field 0 becomes 1, which is outputted to the field select signal 44.

Because the address bus 3 is 68 and the write enable bus 43 is 01000000 (binary) at transition from T4 to T5 cycle, address 100 through address 103 are newly latched in the instruction buffer 40 and the information of the already held address 72 through address 99 is kept held without change. At the same time, because the instruction length signal line 68 is 4, the information of the instruction address bus 64 becomes 72 by adding 4 to 68 and the information of the header address bus 65 becomes 0 by adding 1 to 3 (the addition results in wraparound of 0 through 3).

As for the instruction 5, the above-mentioned T4 cycle becomes the IF stage and, in T5 cycle, the instruction 5 is held in the instruction buffer 40. In T5 cycle, the EXP stage of the instruction 5 is executed.

To be more specific, because the header address bus 64 is 72, the header analyzer 60 finds that the header of the instructions 5 through 8 exists at address 72 through address 75 and latches this 4-byte information held in the instruction buffer 40. Further, because the header address bus 65 is 0, it is found that the header information corresponding to the instruction 5 is the eight bits of address 72. From this information, the header analyzer 60 finds that the instruction 5 consists of eight fields. Therefore, the header information 11111111 (binary) of the instruction 5 is outputted to the field signal line 67 without change. Further, the instruction 5 is 36-byte long including the header and information of 100100 (binary) indicating 36 is outputted to the instruction length signal line 68. Because the instruction length is in excess of 32, the refetch signal line 13 is asserted at transition from T5 to T6.

In other cycles than the initial cycle, the address controller 61 outputs a value obtained by adding 32 to the value of the instruction address bus 64 to the address bus 3. Therefore, in T5 cycle, 104 is outputted to the address bus 3.

Because the instruction address bus 64 is 72 and the instruction length signal line 68 is 36 in T5 cycle, the partial write controller 62 finds that the 32 bytes from the third 4-byte boundary in the instruction buffer 40 correspond to the instruction 5 and 11111111 (binary) is outputted to the write enable bus 43.

Because the instruction address 64 is 72 and the header 0 signal line 66 is asserted in T5 cycle, the select signal generator 63 finds that the field of the instruction 5 is held subsequent to the fourth 32-bit boundary in the instruction buffer 40. Further, which field exists is known from the information of the field signal line 67. Therefore, it is found that, at the fourth 32-bit boundary, the field 0 is held and select information indicating the field 0 becomes 3, which is outputted to the field select signal 44. Likewise, the select information indicating the field 1 becomes 4, the select information indicating the field 2 becomes 5, the select information indicating the field 3 becomes 6, the select information indicating the field 4 becomes 7, the select information indicating the field 5 becomes 0, and the select information indicating the field 6 becomes 1. Because the instruction length is in excess of 32, it is found that the information of the field 7 is not held in the instruction buffer 40, the select information is outputted in the next cycle (T6).

Because the address bus 3 is 104 and the write enable bus 43 is 11111111 (binary) at transition from T5 to T6 cycle, address 104 through address 135 are newly latched in the instruction buffer 40. At the same time, because the instruction length signal line 68 is 36, the information of the instruction address bus 64 becomes 108 by adding 36 to 72 and the information of the header address bus 65 becomes 1 by adding 1 to 0.

As described, in T5 cycle, the field 7 of the instruction 5 cannot be generated, so that T6 cycle is required as an additional EXP (EXP2) stage of the instruction 5.

In T6 cycle, the refetch signal line 13 being asserted indicates the EXP2 stage. When the refetch signal line 13 is asserted, the header analyzer 60, the address controller 61, the partial write controller 62, and the select signal generator 63 perform special operations.

To be more specific, the address controller 61 outputs 136 obtained by adding 28 to 108 of the instruction address bus 64 to the address bus 3. At transition from T6 to T7, the header address is not added with 1 and hence left at 1.

The header analyzer 60 outputs 0 to the instruction length signal line 68. Therefore, at transition from T6 to T7, the information of the instruction address bus 64 is kept at 108 without change. Because the instruction address bus 64 is 108 and the field 7 of the instruction 5 exists at address 104 of the instruction memory 1, the partial write controller 62 finds that the header information exists at the third 4-byte boundary in the instruction buffer 40 and outputs 00100000 (binary) to the write enable bus 43.

Likewise, because the instruction address bus 64 is 108 and the field 7 of the instruction 5 exists at address 104 of the instruction memory 1, the select signal generator 63 finds that the header information exists at the third 4-byte boundary in the instruction buffer 40 and outputs 3 to the field select signal line corresponding to the field 7.

Because, at transition from T5 to T6 cycle, the address bus 3 is 136 and the write enable bus 43 is 00100000 (binary), address 136 through address 139 are newly latched in the instruction buffer 40 and the information of address 108 through address 135 is held without change.

As for the instruction 6, the above-mentioned T6 cycle becomes the IF stage and, in T7 cycle, the instruction 6 is held in the instruction buffer 40. In T7 cycle, the EXP stage of the instruction 6 is executed.

To be more specific, because the header address bus 65 is 1, the header analyzer 60 finds that the header information corresponding to the instruction 6 is at the second byte boundary of the information latched in T5 cycle. From this information, the header analyzer 60 finds that the instruction 6 consists of three fields 1, 2, and 3. Therefore, the header information 01110000 (binary) of the instruction 6 is outputted to the field signal line 67 without change. Further, the instruction 6 is 12-byte long and information of 001100 (binary) indicating 12 is outputted to the instruction length signal line 68. Because the instruction length is not in excess of 32, the refetch signal line 13 is not asserted.

In other cycles than the initial cycle, the address controller 61 outputs a value obtained by adding 32 to the value of the instruction address bus 64 to the address bus 3. Therefore, in T7 cycle, 140 is outputted to the address bus 3.

Because the instruction address bus 64 is 108 and the instruction length signal line 68 is 12 in T7 cycle, the partial write controller 62 finds that the 12 bytes from the fourth 4-byte boundary in the instruction buffer 40 correspond to the instruction 6 and 00011100 (binary) is outputted to the write enable bus 43.

Because the instruction address 64 is 108 and the header 0 signal line 66 is not asserted in T7 cycle, the select signal generator 63 finds that the field of the instruction 6 is held subsequent to the fourth 32-bit boundary in the instruction buffer 40. Further, which field exists is known from the information of the field signal line 67. Therefore, it is found that, at the fourth 32-bit boundary, the field 1 is held and select information indicating the field 1 becomes 3, which is outputted to the field select signal 44. Likewise, the select information indicating the field 2 becomes 4 and the select information indicating the field 3 becomes 5.

Because the address bus 3 is 140 and the write enable bus 43 is 00011100 (binary) at transition from T7 to T8 cycle, address 140 through address 151 are newly latched in the instruction buffer 40. The already held information of address 120 through address 139 are kept held without change. At the same time, because the instruction length signal line 68 is 12, the information of the instruction address bus 64 becomes 120 by adding 12 to 108 and the information of the header address bus 65 becomes 2 by adding 1 to 1.

The instructions subsequent to the instruction 6 are sequentially executed repeatedly in the same sequence. At transition from the EXP stage to the EXE state of each instruction, the expanded instruction field is latched in each of the instruction registers 14 through 21. Therefore, in the EXE stage, the computing units 22 through execute computational operations under the control of the instruction registers 14 through 21. The results are written, in the WB stage, to the register specified by the instruction field, upon which the instruction execution comes to an end.

So far, the operations of the field controller 42 have been made. The following describes in detail the components thereof, namely the header analyzer 60, the address controller 61, the partial write controller 62, and the select signal generator 63.

Figure 11:
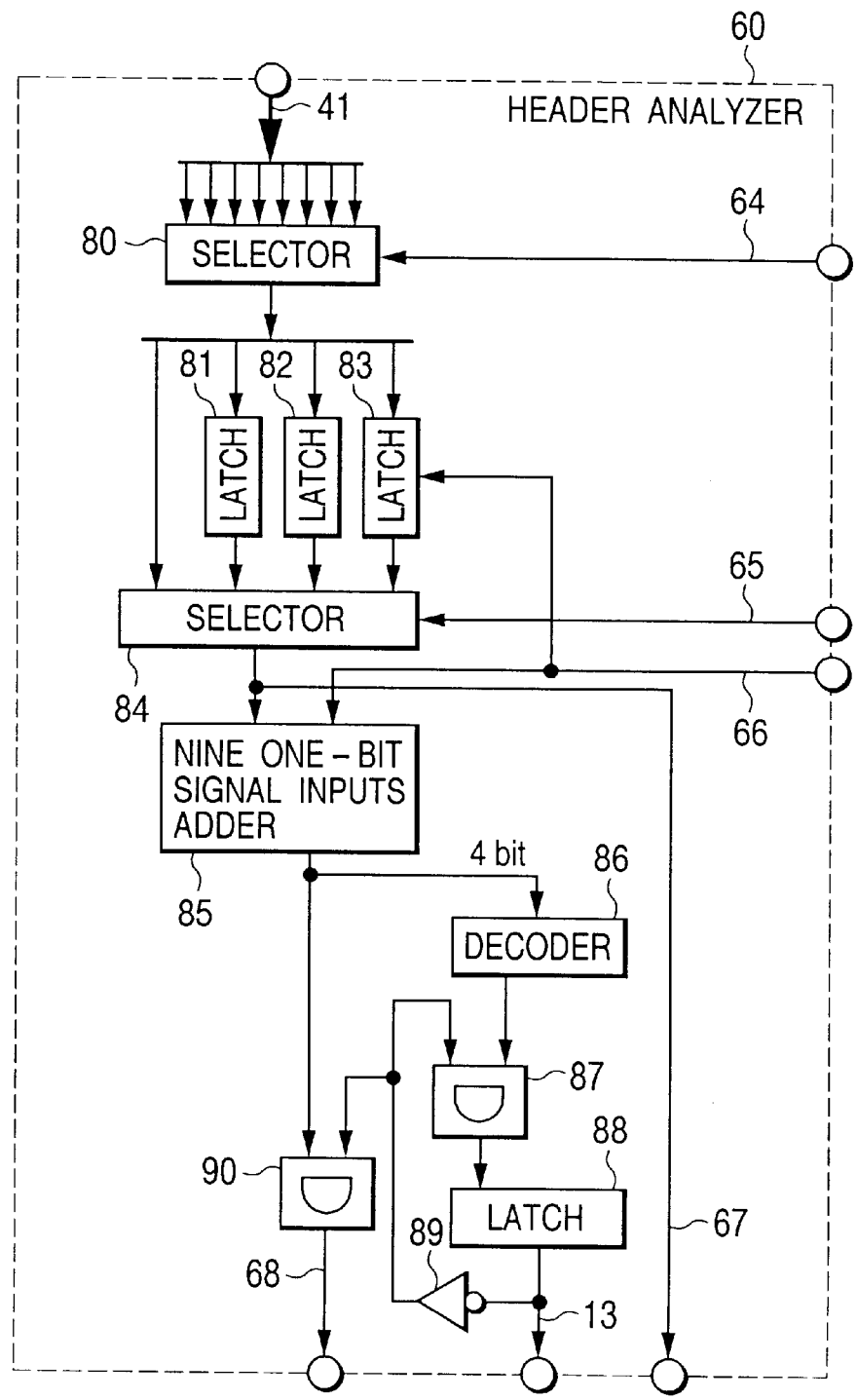
FIG. 11 is a block diagram illustrating a head analyzer 60 in detail.

FIG. 11 shows a block diagram illustrating the header analyzer 60 in detail. With reference to FIG. 11, circuit blocks and signal lines similar to those previously described with FIG. 8 are denoted by the same reference numerals. In the figure, reference numeral 80 denotes a selector for selecting one of eight 4-byte data, reference numerals 81 through 83 denote latch circuits each holding 1-byte data, reference numeral 84 denotes a selector for selecting one of four 1-byte data, reference numeral 85 denotes a nine one-bit signal inputs adder, reference numeral 86 denotes a 4-bit decoder, reference numeral 87 denotes an AND circuit 87, reference numeral 88 denote a 1-bit latch circuit, reference numeral 89 denotes a 1-bit inverter, and reference numeral 90 denotes an AND circuit 90.

Of the 32-bit instruction address bus 64 (IA31 through IAO), the selector 80 determines the position of the header from three bits of IA4 through IA2 and outputs 4-byte (for four instructions) header information. When the header 0 signal line 66 is asserted, of the header information, the first instruction header is outputted to the selector 84, the second instruction header is outputted to the latch circuit 81, the third instruction header is outputted to the latch circuit 82, and the fourth instruction header is outputted to the latch circuit 83.

According to the information of the header address bus 65, the selector 84 selects the above-mentioned first header information when 0, the header information held in the above-mentioned latch circuit 81 when 1, the header information held in the above-mentioned latch circuit 82 when 2, or the header information held in the above-mentioned latch circuit 83 when 3, and outputs the selected header information to the field signal line 67.

From the information of the field signal line 67, the adder 85 generates instruction length information. The nine inputs include eight bits of the field signal line 67 and one bit of the header 0 signal line 66. Basically, the instruction length is known by counting the number of fields of the field signal line 67. Further, in a cycle in which the header 0 signal line 66 is asserted, the instruction includes the header information, so that 1 is added to the instruction length generated from the number of fields. Therefore, the result of the addition by the adder 85 is in a range of 0 to 9 and the instruction length is outputted in 4-bit information. The actual instruction length is obtained by multiplying the above-mentioned add result by 4, resulting in 0 to 36 bytes.

The decoder 86 is a circuit for detecting a 36-byte instruction, asserting the output when the input information is 9.

When the output of the decoder 86 is asserted, the latch circuit 88 asserts the refetch signal line 13 when transition is made between cycles.

When the refetch signal line 13 is asserted, the output of the inverter 89 is negated and the AND circuit 87 masks the output of the decoder 86.

In this state, when transition is made between cycles, the latch circuit 88 negates the refetch signal line 13. Namely, the refetch signal line 13 is always negated in the cycle next to the cycle in which the refetch signal line 13 is asserted. When the refetch signal line 13 is asserted, the output of the inverter 89 masks the output of the adder 85 and the AND circuit 90 outputs the information of instruction length 0 to the instruction length signal line 68. If the refetch signal line is not asserted, the instruction length information outputted from the adder 85 is outputted to the instruction signal line 68.

Thus, the header analyzer 60 can output necessary information to the instruction length line 68, the field signal line 67, and the refetch signal line 13.

Figure 12:
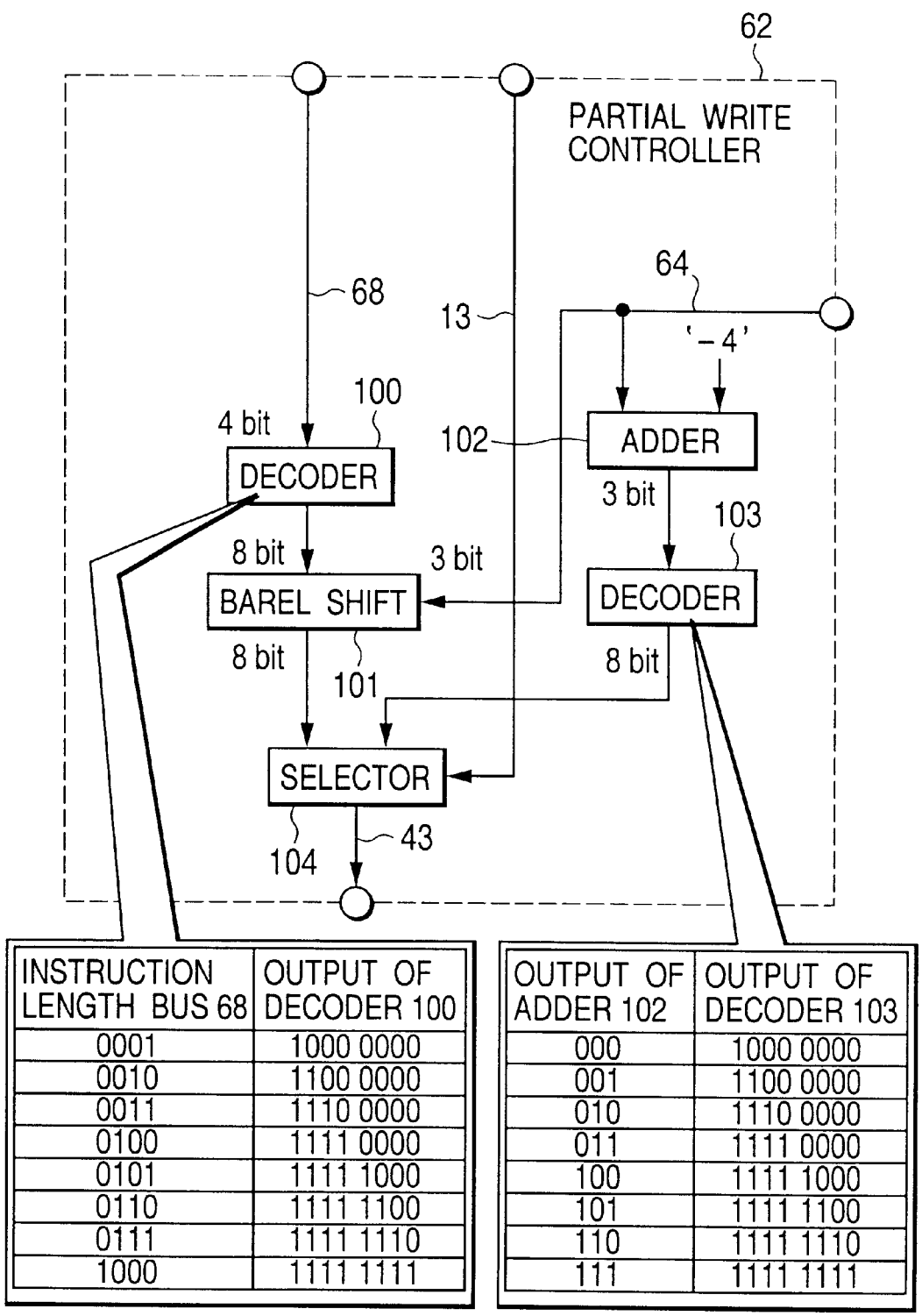
FIG. 12 is a block diagram illustrating a partial write controller 62 in detail.

Next, detail operations of the partial write controller 62 will be described. FIG. 12 shows a block diagram illustrating a detailed constitution of the partial write controller 62. In the figure, the circuit blocks and signal lines similar to those previously described with FIG. 8 are denoted by the same reference numerals.

In the figure, reference numeral 100 denotes a 4-bit input and 8-bit output decoder, reference numeral 101 denotes an 8-bit barrel shifter, reference numeral 102 is a 3-bit adder, reference numeral 103 denotes an address bus 3-bit input and 8-bit output decoder, and reference numeral 104 denotes a selector for selecting the outputs of the barrel shifter 101 and the decoder 103 and outputting the selected outputs to the write enable bus 43.

The decoder 100 generates 8-bit information according to a conversion table shown in the figure.

This information is rotated in the barrel shifter 101 according to the 3-bit (IA4 through IA2) information of the instruction address bus 64. Consequently, the information outputted from the barrel shifter 101 indicates on a 4-byte basis where the instruction indicated by the instruction address bus 64 is held in the instruction buffer 40. Namely, this information indicates the location of the instruction buffer 40 to be updated at transition to the next cycle.

Consequently, if the refetch signal line 13 is not asserted, the selector 104 selects this information and outputs the selected information to the write enable bus 43. on the other hand, in the cycle in which the refetch signal line 13 is asserted, the instruction address bus indicates the start address of the next instruction, so that a value obtained by subtracting 4 from that address provides an address at which the field 7 of the instruction is stored.

To obtain the storage location of the field 7 in the instruction buffer 40, the adder 102 adds 7 (110 binary) to the information of three bits (IA4 through IA2) of the instruction address bus 64. From the result of this addition, information to be outputted to the write enable bus 43 is generated according to the conversion table shown of the decoder 103.

To do so, the selector 104 selects the output of the decoder 103 when the refetch signal line 13 is asserted.

Thus, the partial write controller 62 can output the necessary information to the write enable bus 43.

Figure 13:
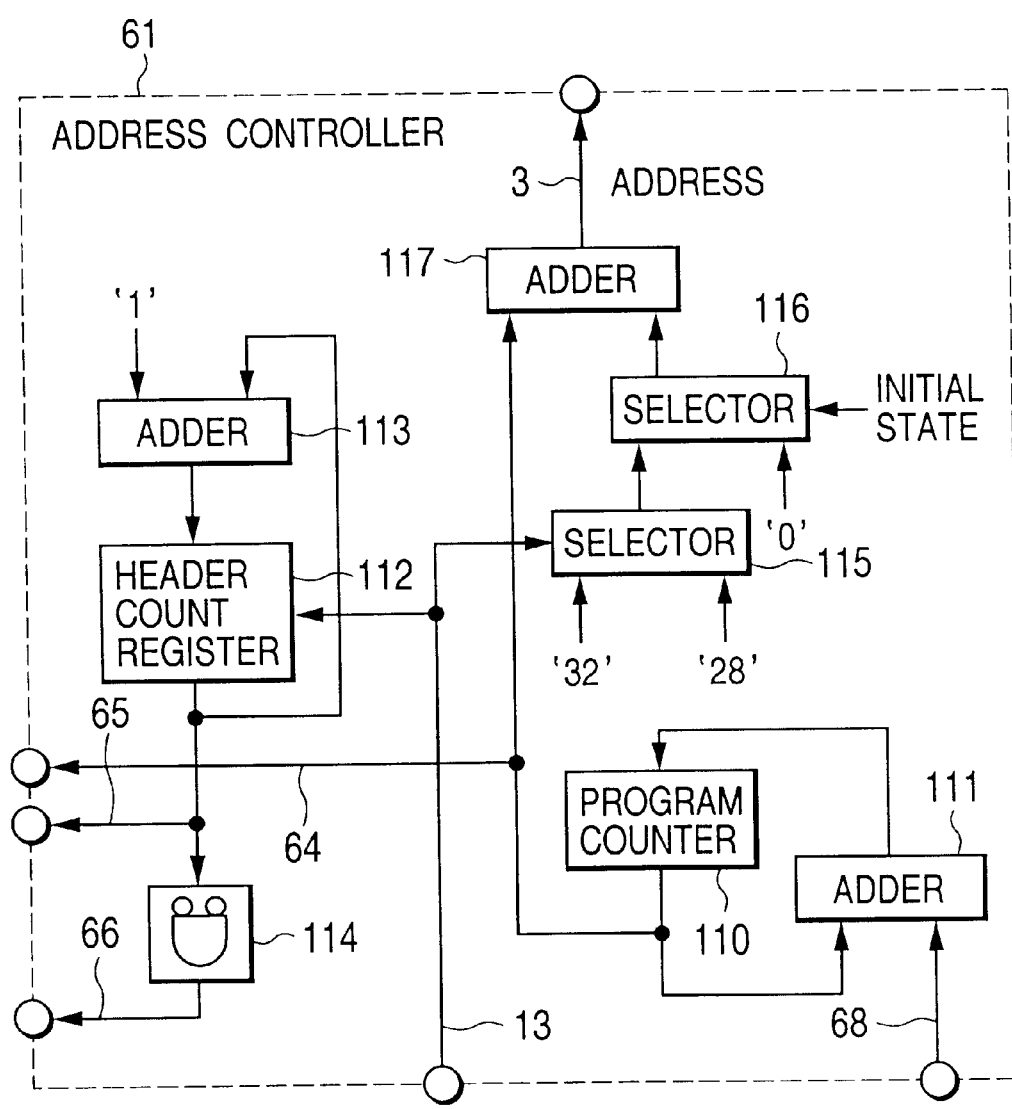
FIG. 13 is a block diagram illustrating an address controller 61 in detail.

The following describes detail operations of the address controller 61. FIG. 13 shows a block diagram illustrating a constitution of the address controller in detail. In the figure, the circuit blocks and signal lines similar to those previously described with FIG. 8 are denoted by the same reference numerals.

In the figure, reference numeral 110 denotes a program counter holding 32-bit address instruction address information, reference numeral 111 denotes a 32-bit adder, reference numeral 112 denotes a 2-bit header counter register, reference numeral 113 denotes a 2-bit adder, reference numeral 114 denotes a 2-input NOR circuit for outputting negate information of OR operation, reference numeral 115 denotes a selector for selecting 32 or 28, reference numeral 115 denotes a selector for selecting the output of the selector 115 or 0, and reference numeral 117 denotes a 32-bit adder.

The program counter 110 updates the instruction address information every time a cycle transition occurs. The update information is generated by the adder 111 by adding the information of the instruction length signal line 68 to the instruction address information of the program counter 110. The generated information is outputted to the instruction address bus 64.

The header count register 112 holds header address information (0 through 2) and, like the program counter 110, updates the header address information every time a cycle transition occurs. The update information is generated by the adder 111 by adding 1 to the header address information. The generated information is outputted to the header address bus 65.

The NOR circuit 114 detects that the header address information is 0 and asserts the header 0 signal line 66.

The selector 115 selects "32" when the refetch signal line 13 is not asserted and "28" when the refetch signal line 13 is asserted and outputs the selection.

The selector 116 selects 0 only in the initial state or the output of the selector 115 in other cases and outputs the selection.

The adder 117 outputs a result obtained by adding the information of the instruction address bus 64 to the output information of the selector 116 to the address bus 3.

Thus, the address controller 61 can output the necessary information to the instruction address bus 64, the header address bus 65, and the header 0 signal line 66, and the address bus 3.

Figure 14:
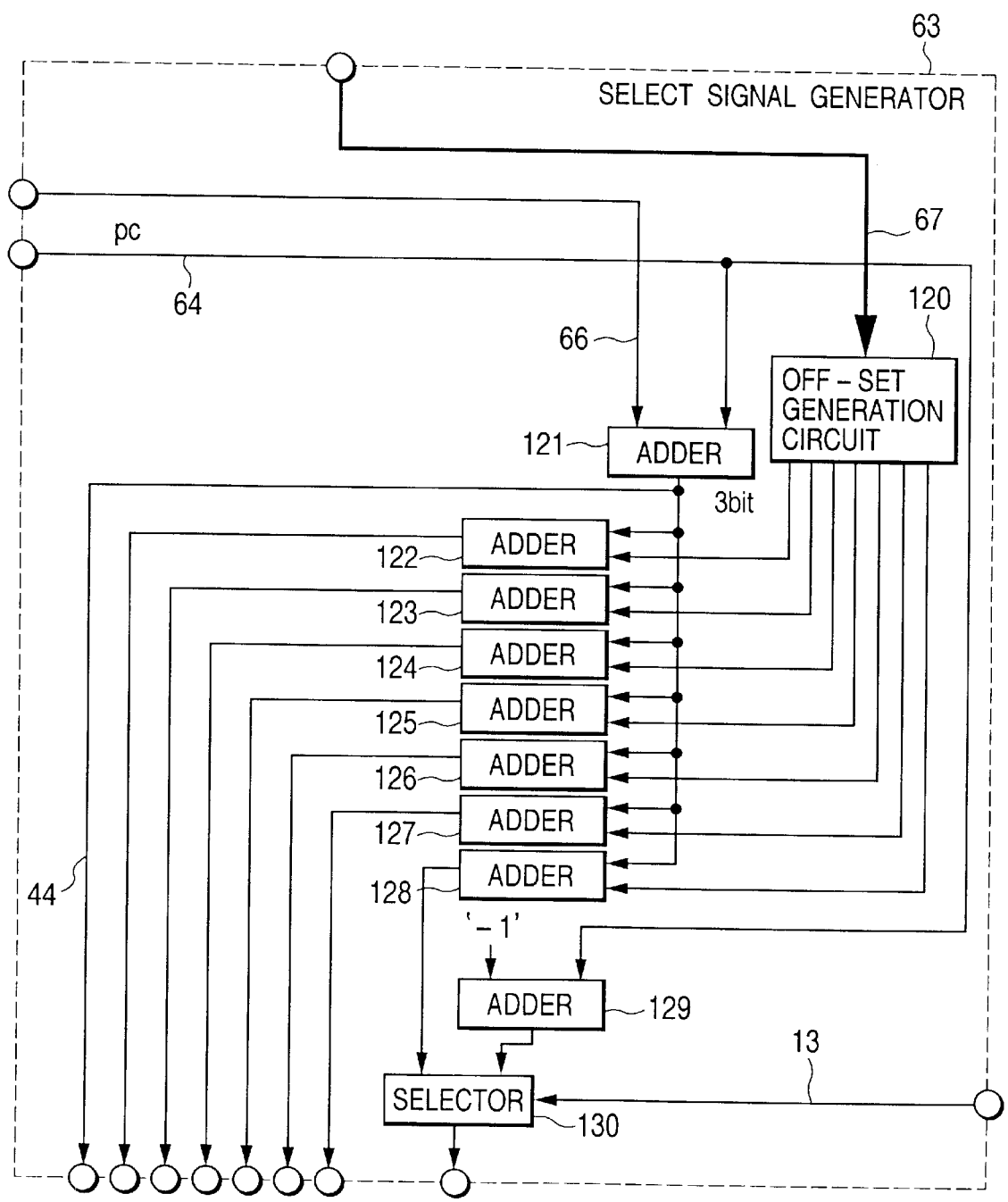
FIG. 14 is a block diagram illustrating a select signal generator 63 in detail.

The following describes operations of the select signal generator in detail. FIG. 14 shows a block diagram illustrating the selector generator 63 in detail. In the figure, the circuit blocks and signal lines similar to those previously described with FIG. 8 are denoted by the same reference numerals.

In the figure, reference numeral 120 denotes an offset generation circuit, reference numeral 121 denotes a 3-bit adder, reference numerals 122 through 128 denote 3-bit adders, reference numeral 129 denotes a 3-bit adder, and reference numeral 130 denotes a selector.

The offset generation circuit 120 generates 3-bit information indicating a relative position of each of the fields 1 through 7 with the position of the first field being 0. The relative position denotes a relative location in the compressed state stored in the instruction memory 1. Therefore, the offset generation circuit 120 outputs information valid only for the relative locations of existing fields. Details of the offset generation circuit will be described later.

The adder 121 adds 1-bit information of the header 0 signal line 66 to the 3-bit information (IA4 through IA2) of the instruction address bus and outputs the result of the addition. In an instruction including the header, the information of the instruction address bus 64 points at the header position, so that, in order to find the field position of the first field of that instruction, the addition by the adder 121 is required. If the field 0 exists, the result of the addition is outputted to the field select signal line 44 because the result points at the location of the field 0.

The adder 122 generates the absolute positional information of the field 1 by adding the relative positional information of the field 1 outputted by the offset generation circuit to the first field positional information. Likewise, the adders 123 through 128 generate absolute positional information of the fields 2 through 7 by adding relative positional information of the fields 2 through 7 outputted by the offset generation circuit 120 to the first field positional information.

Especially, the selector 130 selects, if the refetch signal line 13 is not asserted, the outputs of the register file 28 and, if the refetch signal line 13 is asserted, the output of the adder 129 and outputs the selection as select information of the field 7.

When the refetch signal line 13 is asserted, the instruction address bus 64 indicates the next instruction address information, so that the address information of the field 7 is the above-mentioned address information minus 4. Therefore, like the adder 121, the adder 129 generates the select information of the field 7 by adding −1 (111 binary) to the 3-bit (IA4 through IA2) information of the instruction address bus 64.

Thus, the select signal generator 63 can output the necessary information to the field select signal line 44 and so on.

Figure 15:
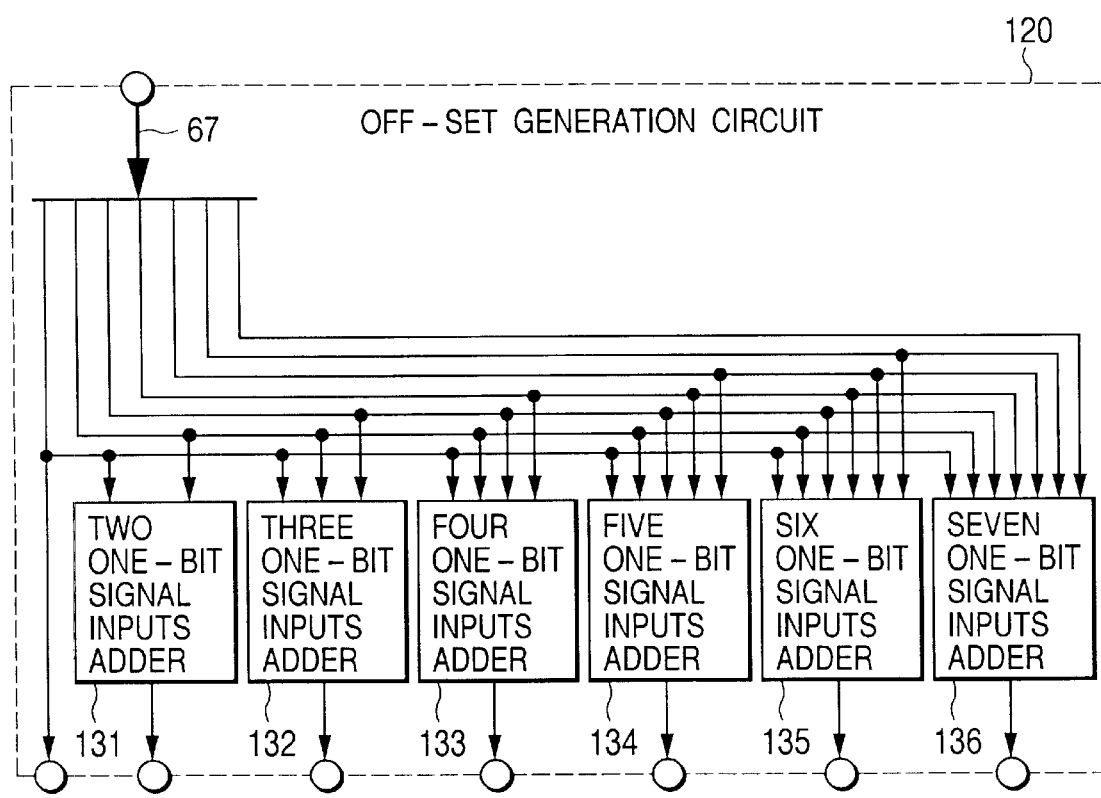
FIG. 15 is a block diagram illustrating an offset generating circuit 120 in detail.

FIG. 15 shows a constitution of the above-mentioned offset generation circuit in detail. In the figure, the circuit blocks and signal lines similar to those previously described with FIG. 14 are denoted by the same reference numerals.

In the figure, reference numeral 131 denotes a two one-bit signal inputs adder, reference numeral 132 denotes a three one-bit inputs adder, reference numeral 133 denotes a four one-bit inputs adder, reference numeral 134 denotes a five one-bit inputs adder, reference numeral 135 denotes a six one-bit inputs adder, and reference numeral 136 denotes a seven one-bit inputs adder.

In the offset generation circuit 120, the relative positional information of the field 1 is 1 if the field 0 exists and 0 if the field 0 does not exist, so that the relative positional information is the information itself of the field 0 of the field signal line 67. The relative positional information of the field 2 depends on presence or absence of the field 0 and field 1; when none of the fields exists, the relative positional information is 0, when either of the fields exists, the relative positional information is 1, and when both fields exist, the relative positional information is 2. Therefore, when 1-bit information of the field 0 is added to 1-bit information of the field 1 in the adder 131, the relative positional information is generated.

Likewise, relative positional information of the field 3 depends on presence or absence of the fields 0 through 2. The relative positional information is generated by adding 1-bit information of the fields 0 through 2 together in the adder 132. Likewise, relative positional information of the field 4 depends on presence or absence of the fields 0 through 3. The relative positional information is generated by adding 1-bit information of the fields 0 through 3 together in the adder 133. Likewise, relative positional information of the field 5 depends on presence or absence of the fields 0 through 4. The relative positional information is generated by adding 1-bit information of the fields 0 through 4 together in the adder 134. Likewise, relative positional information of the field 6 depends on presence or absence of the fields 0 through 5. The relative positional information is generated by adding 1-bit information of the fields 0 through 5 together in the adder 135. Likewise, relative positional information of the field 7 depends on presence or absence of the fields 0 through 6. The relative positional information is generated by adding 1-bit information of the fields 0 through 6 together in the adder 136.

So far, the field controller 42 has been described in detail. The following describes the SIMD controller 46 in detail.

Figure 16:
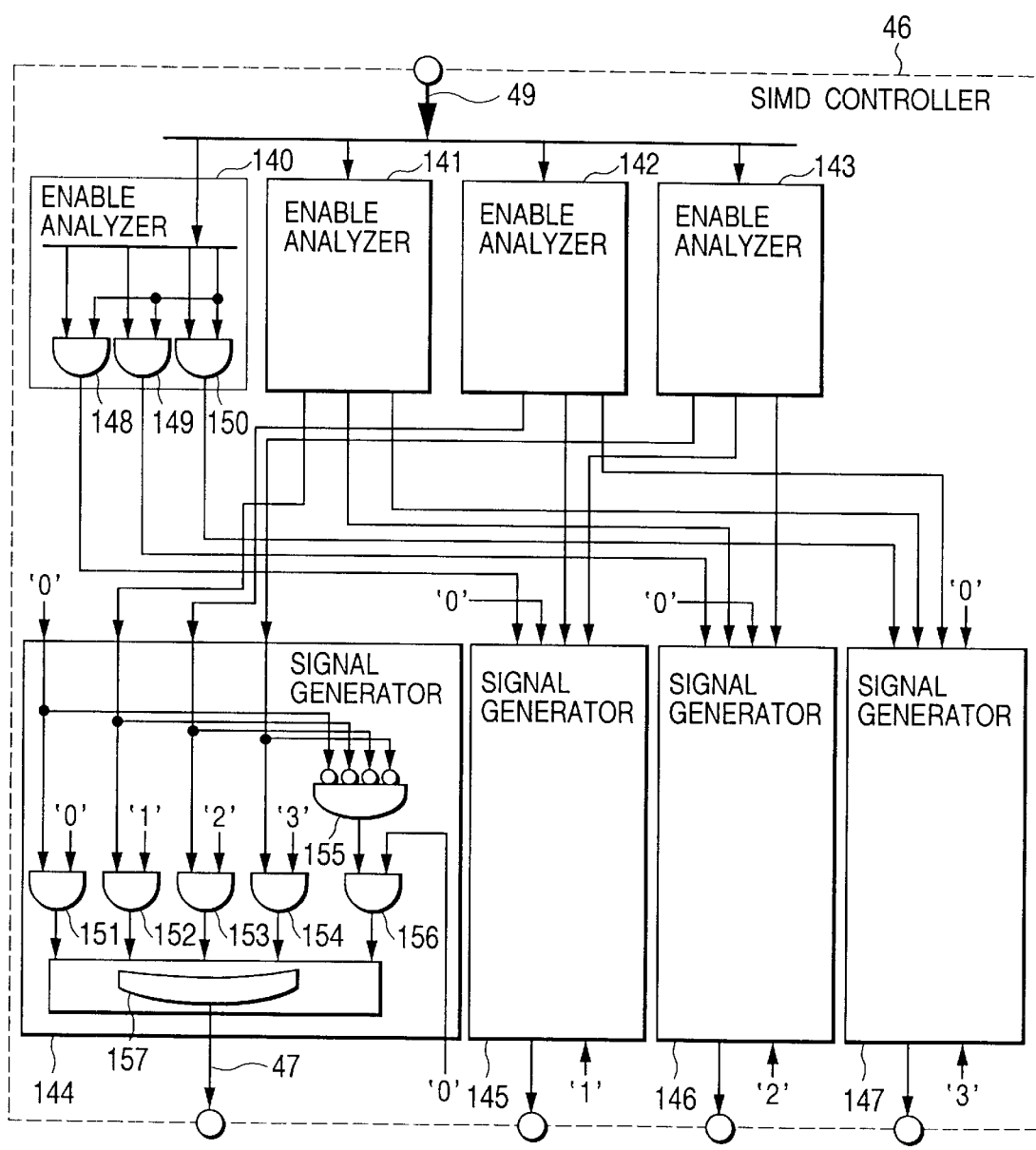
FIG. 16 is a block diagram illustrating an SIMD controller 46 in detail.

FIG. 16 shows a block diagram illustrating the SIMD controller 46 in detail. In the figure, the circuit blocks and signal lines similar to those previously described with FIG. 7 are denoted by the same reference numerals. In the figure, reference numeral 140 denotes an enable analyzer, reference numerals 141 through 143 denote enable analyzers functionally the same as the enable analyzer 140, reference numeral 144 denotes a signal generator, reference numerals 148 through 150 denote 2-input AND circuits, reference numerals 151 through 154 and 156 denote AND circuits for outputting 0 if the left-side input one bit is 0 and the right-side 2-bit information if the left side input one bit is 1, reference numeral 155 denotes a NOR circuit 155 for outputting negate information of 4-input 1-bit OR.

The enable analyzer 140 detects whether the SIMD mode is specified in the field 0 and inputs from the expanded field bus 49 four bits of bits 9 through 11 ("SIMD") of the field 0 and bit 27 ("S-mode")(refer to FIG. 2). If "S-mode" is 0, the AND circuits 148, 149 and 150 output 0. On the other hand, if the S-mode bit is 1, the AND circuit 148 outputs information of bit 9, the AND circuit 149 outputs information of bit 10, and AND circuit 150 outputs information of bit 11. According to the meaning of "SIMD" shown in FIG. 2, if the information of the AND circuit 148 is 1, it indicates that the contents of the fields 0 and 1 are copied to the fields 1 and 2. Likewise, if the information of the AND circuit 149 is 1, it indicates that the contents of the fields 0 and 1 are copied to the fields 4 and 5; if the information of the AND circuit 150 is 1, it indicates that the contents of the field 0 and 1 are copied to the fields 6 and 7.

Likewise, the enable analyzer 141 detects whether the SIMD mode is specified in the field 2, the enable analyzer 142 detects whether the SIMD mode is specified in the field 4, and the enable analyzer 143 detects whether the SIMD mode is specified in the field 6 to identify copy destinations. Copy instructions issued from the enable analyzers 140 through 143 are sent to the signal generator. To be more specific, the signal generator 144 determines by which field the fields 0 and 1 are copied. Copy instructions from the fields 2 and 3 are sent to the AND circuit 152, copy instructions from the fields 4 and 5 are sent to the AND circuit 153, and copy instructions from the fields 6 and 7 are sent to the AND circuit 154. These copy instructions are not sent from a plurality of enable analyzers at the same time. This is basically guaranteed by the compiler. By the same reason, no copy instruction is sent from the enable analyzer 140 in the signal generator 144, so that the inputs to the AND circuit 151 are fixed to 0.

Receiving the copy instruction, the AND circuit 152 outputs 1 that is information for selecting the fields 2 and 3 as copy sources. Likewise, the AND circuit 153 outputs 2 and the AND circuit 154 outputs 3. If no copy instruction is issued (namely, not in the SIMD mode), the NOR circuit 155 detects this and the AND circuit 156 outputs select information 0 so that the fields 0 and 1 are selected. Finally, the OR circuit 157 outputs a logical add of 3-bit information outputted from the AND circuits 151 through 154 and 156 to the SIMD select signal line 47 as the select information of fields 0 and 1.

The signal generator 145 operates basically the same manner as the signal generator 144. However, because the select information of the fields 2 and 3 is outputted, no copy instruction is sent from the enable analyzer 141, so that the input corresponding thereto is fixed to 0 and select information 1 is outputted to make fields 2 and 3 be selected when no copy instruction (namely, not in the SIMD mode) is detected.

Likewise, the signal generator 146 operates basically the same manner as the signal generator 144. However, because the select information of the fields 4 and 5 is outputted, no copy instruction is sent from the enable analyzer 142, so that the input corresponding thereto is fixed to 0 and select information 2 is outputted to make fields 4 and 5 be selected when no copy instruction (namely, not in the SIMD mode) is detected.

Further, the signal generator 147 operates basically the same manner as the signal generator 144. However, because the select information of the fields 6 and 7 is outputted, no copy instruction is sent from the enable analyzer 143, so that the input corresponding thereto is fixed to 0 and select information 3 is outputted to make fields 2 and 3 be selected when no copy instruction (namely, not in the SIMD mode) is detected.

So far, the first embodiment shown in FIG. 1 has been described. In this embodiment, the NOP compressed header is assumed and this header is also used in the SIMD mode.

Normally, in VLIW, about 80% of the objects is occupied by NOP. Therefore, NOP compression is an essential technology when memory usage efficiency is taken into consideration. Use of the header used by this technology also in the SIMD mode mitigates the overhead, which is the feature of this embodiment.

In the above-mentioned embodiment, the SIMD mode is implemented by adding four bits to each field. If no header is assumed, it is necessary to add seven bits to each field for implementing the SIMD mode. Namely, in addition to the four bits used in this embodiment, two bits for field address and one bit for synchronization control are required.

Because an omitted field exists in the SIMD mode, each field needs to know the fields 0, 1, fields 2, 3, fields 4, 5, or the fields 6, 7. Necessary for this are the two bits for field address. In addition, because the number of fields of one instruction is not constant, distinction between instructions is not known. To make the distinction clear, the 1-bit of synchronization control is required. By inverting information of this bit for every instruction, the distinction can be detected. Therefore, if compression in unit of one field is considered like the embodiment, the following number of bits are required for one instruction (32 bits×8=256 bits):

8[field]×(2[field address]+1[sync control])+8[field]/2×(3 ["SIMD"]+1["S-mode"])=40 bits, where words enclosed in [ ] denote the meaning of the preceding numeral. As long as compression in unit of two fields is concerned, the following number of bits is required for one instruction:

8/2×(2+1)+8/2×(3+1)=28 bits.

On the other hand, the present embodiment requires only the following number of bits including the header:

8[header]+8/2×(3+1)=24 bits.

Therefore, the overhead for implementing the SIMD mode can be mitigated.

Figure 17:
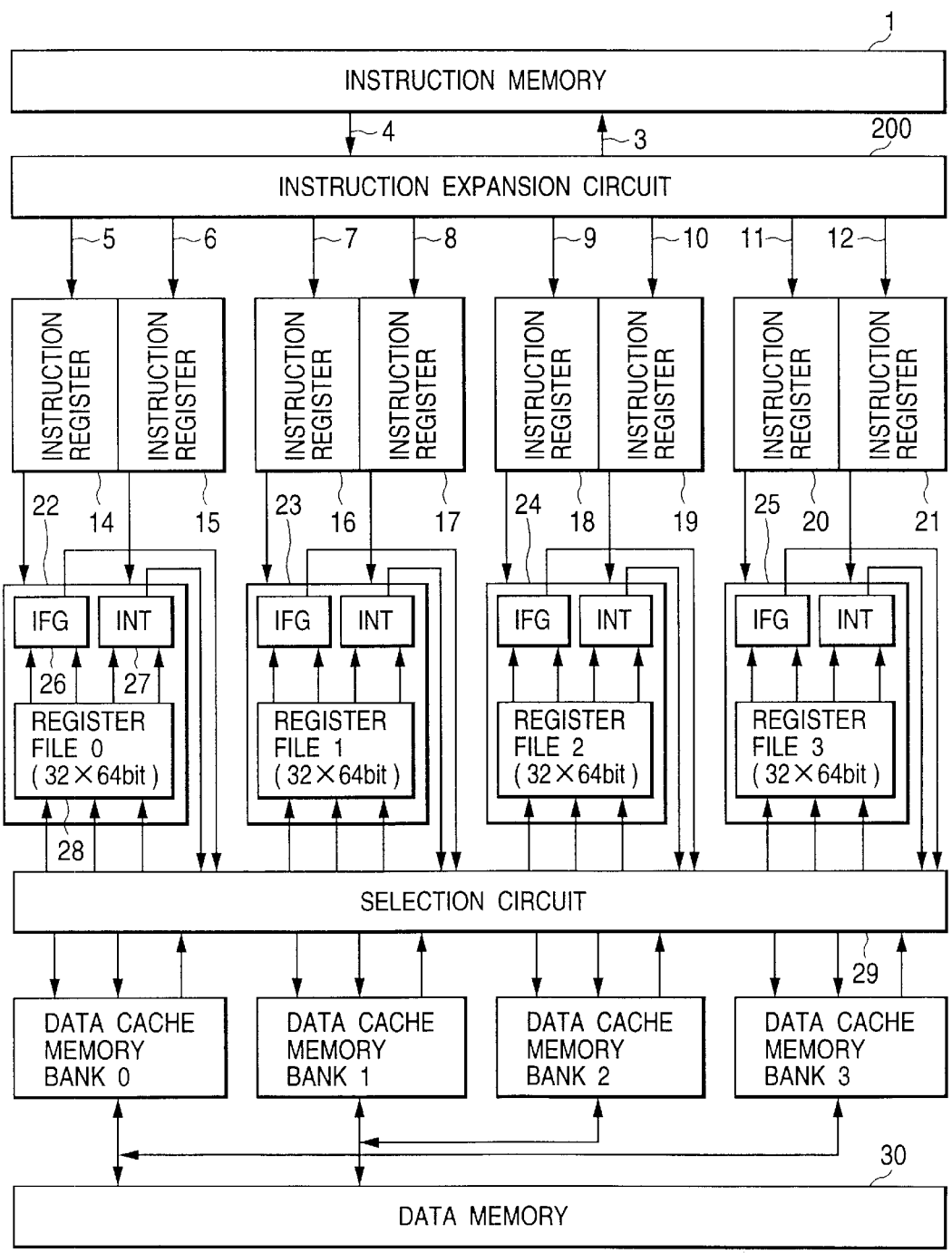
FIG. 17 is a block diagram illustrating a processor practiced as a second embodiment of the invention.

The following describes a method not assuming the above-mentioned header practiced as a second embodiment of the invention with reference to FIG. 17. Especially, in the second embodiment, the above-mentioned compression in unit of two fields is considered. FIG. 17 is a block diagram illustrating a VLIW processing in its entirety. In the figure, the circuit blocks and signal lines similar to those previously described with FIG. 1 are denoted by the same reference numerals. In the figure, reference numeral 200 denotes an instruction expansion circuit different from that shown in FIG. 1. In the present embodiment, no header is used, so that one instruction always consists of 32 bytes or less and the refetch signal line 13 of FIG. 1 is not required. Namely, EXP2 stage required by the instruction 5 shown in FIG. 10 does not exist. This is one of features of the present embodiment. Except for this point and the internal operations of the instruction expansion circuit 200, the present embodiment is the same as the embodiment of FIG. 1.

Figure 18:
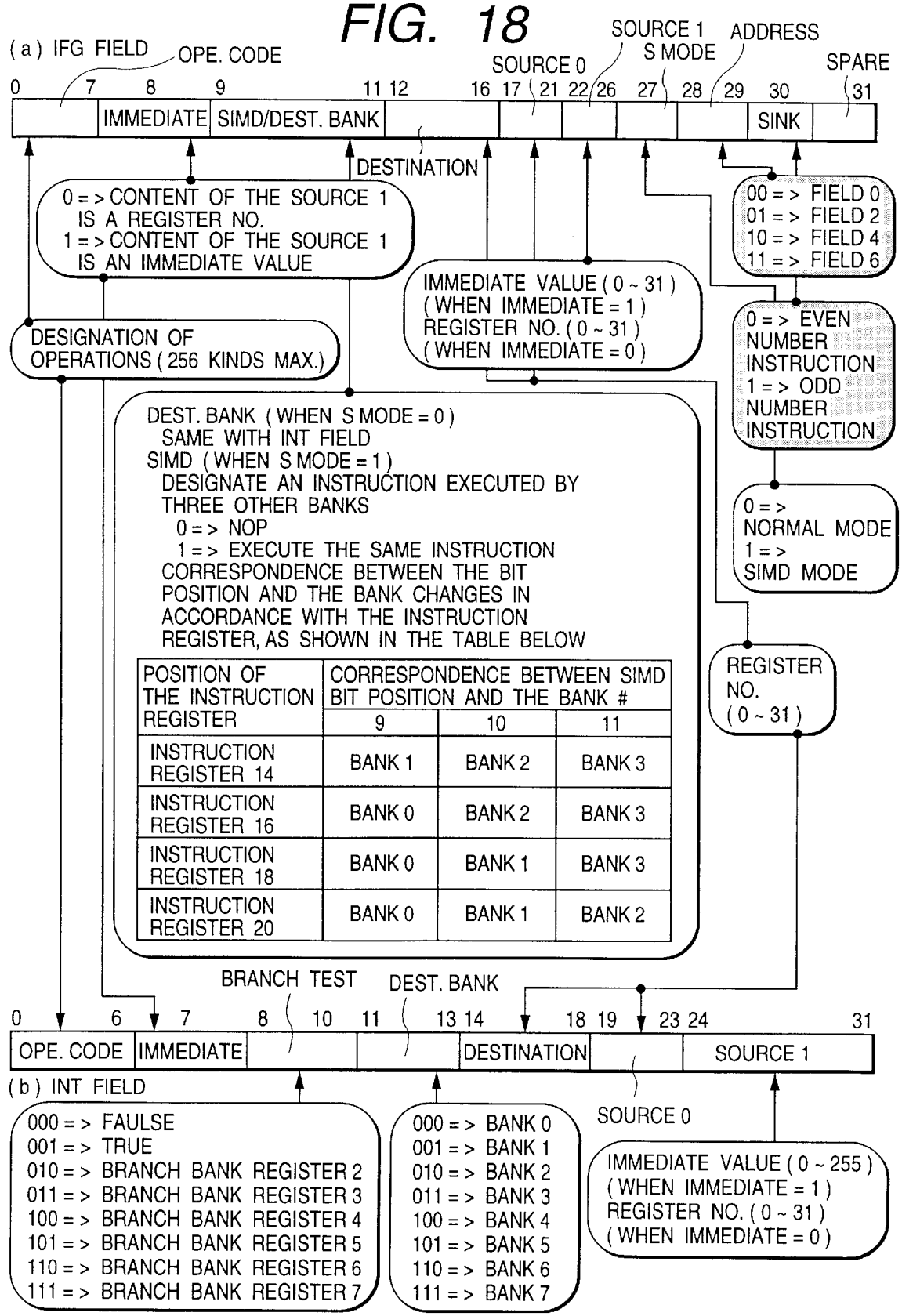
FIG. 18 is a diagram illustrating an instruction format indicating the second embodiment.

FIG. 18 shows an instruction format of the present embodiment. In the figure, bits 0 through 27 of the INT field and the IFG field are the same as those of the first embodiment. Bits 28 and 29 of the IFG field indicate the address of that field. The IFG field is one of the fields 0, 2, 4 and 6 and bit assignment is as shown in the figure. Bit 30 (sync) of the IFG field indicates a synchronous signal. By inverting the sync bit for every instruction, the distinction between instruction can be recognized. In the figure, it is specified that the sync bit becomes 0 for an even-number instruction and 1 for an odd-number instruction. Based on such an instruction format, detailed operations of the instruction expansion circuit 200, key to the present embodiment, will be described.

Figure 19:
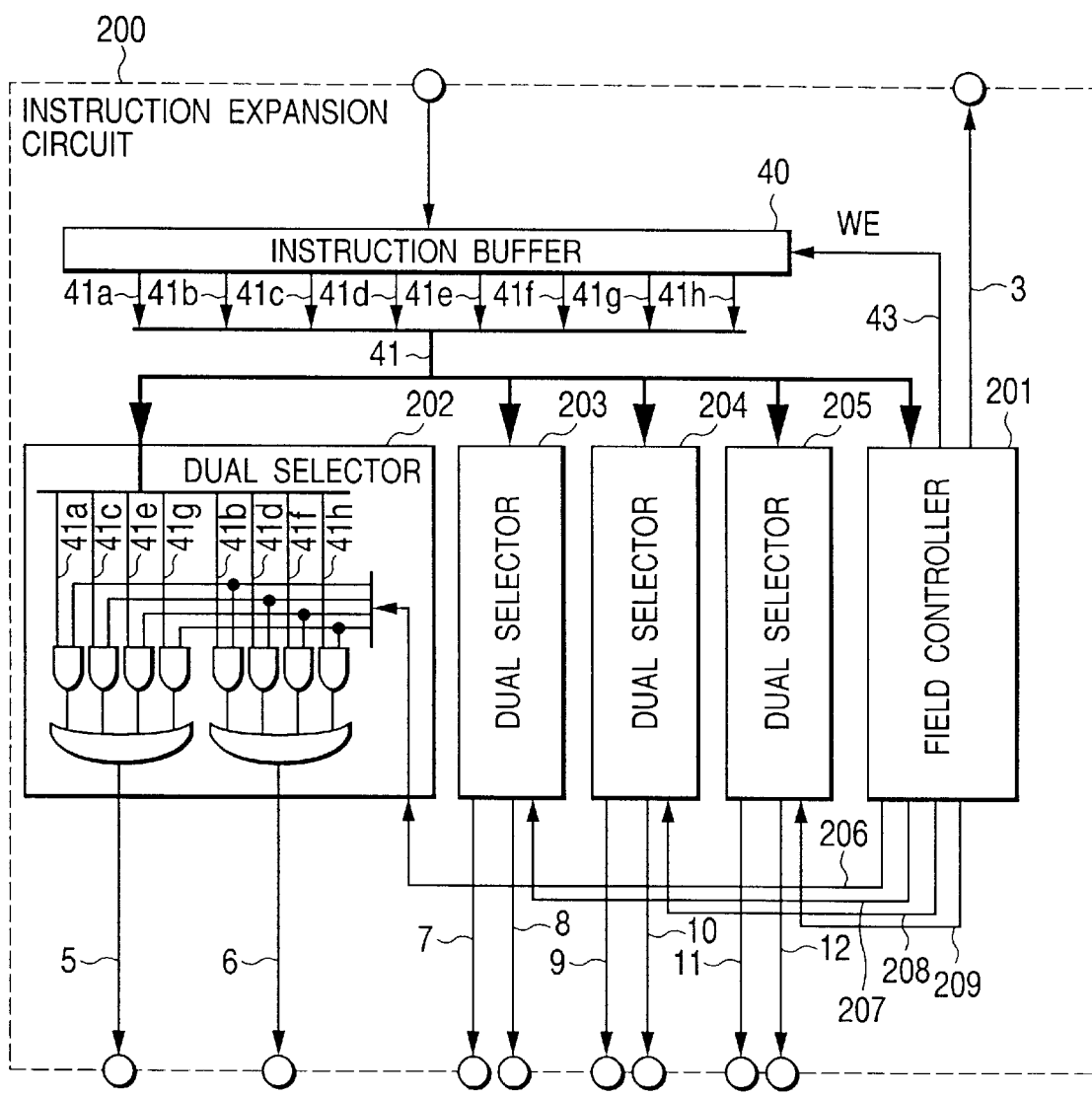
FIG. 19 is a block diagram illustrating an instruction expansion circuit 200 in detail.

FIG. 19 is a block diagram illustrating the instruction expansion circuit 200 in detail. In the figure, the circuit blocks and signal lines similar to those previously described with FIGS. 17 and 7 are denoted by the same reference numerals.

In the figure, reference numeral 201 denotes a field controller for generating information for selecting from a compressed field bus 41 each field for generating one instruction, reference numerals 206 through 209 denote select information lines for transferring the above-mentioned select information, reference numeral 202 denotes a dual selector for generating fields 0 and 1, reference numeral 203 denotes a dual selector for generating fields 2 and 3, reference numeral 204 denotes a dual selector for selecting fields 4 and 5, and reference numeral 205 denotes a dual selector for generating fields 6 and 7. Although not shown, the dual selectors 203 through 205 are the same in circuit constitution as dual selector 202. The 32 bytes simultaneously read from the instruction buffer 40 are constituted by eight signal lines (41a through 41h) in unit of four bytes equivalent to one field. Reference numeral 41a corresponds to data read from address (32×N), reference numeral 41b corresponds to data read from address (32×N+4), ..., reference numeral 41h corresponds to data read from address (32×N+28).

The dual selector 202, according to the select information of the select information line 206, outputs the data of the field 0 selected from the compressed field buses 41a, 41c, 41e, and 41g to the field 5 and the data of the field 1 selected from the compressed field buses 41b, 41d, 41f, and 41h to the field bus 6. The select information of the select information line 206 is constituted by four bits, one bit of which is basically asserted. If none of these four bits is asserted, a NOP field is assumed and 0 corresponding to the NOP field is outputted. This allows NOP compression on a 2-field basis. Likewise, the dual selectors 203 through 205 generate the data of fields 2 through 7 and output the generated data.

Figure 20:
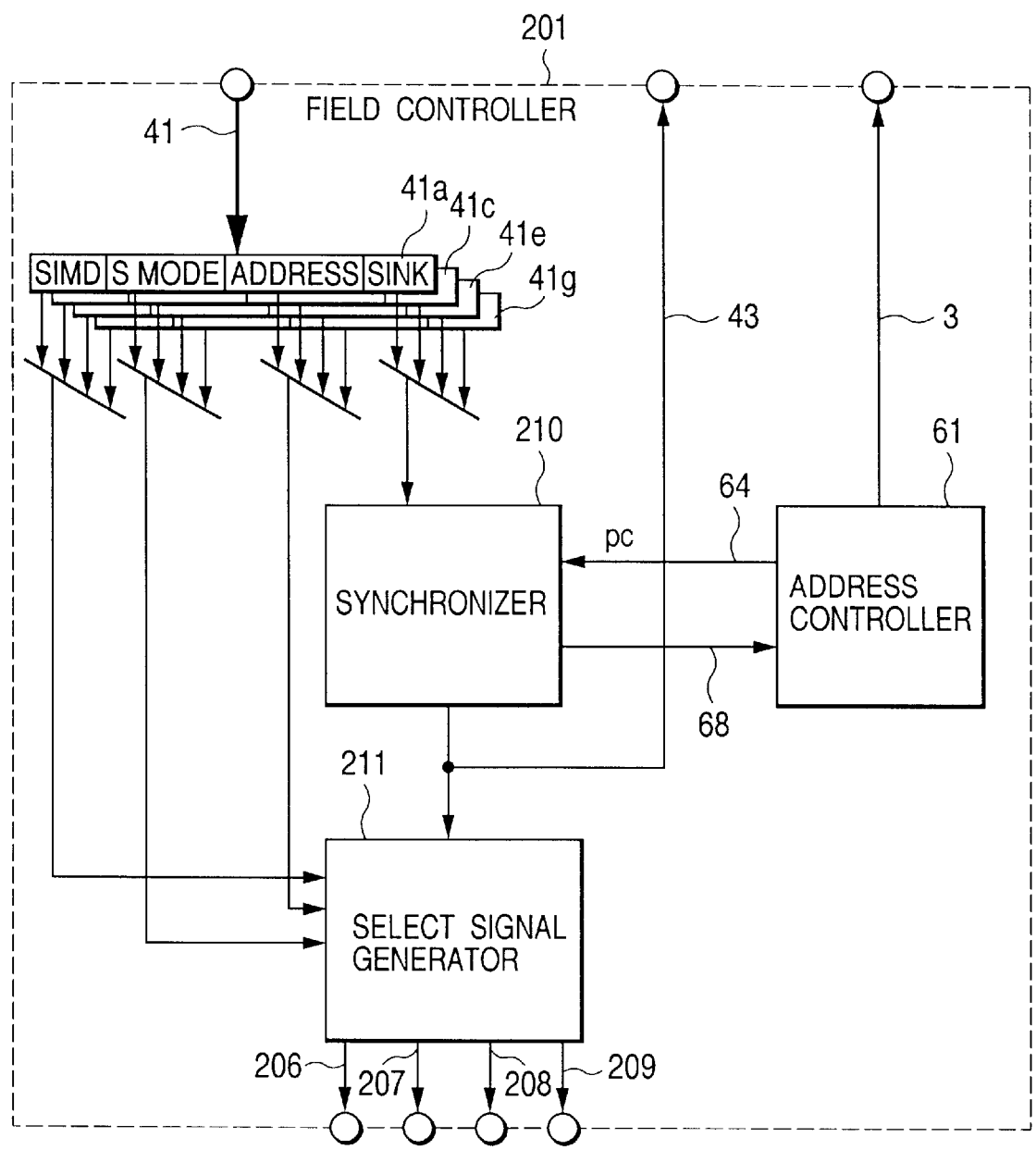
FIG. 20 is a block diagram illustrating a field controller 201 in detail.

The following describes the details of the field controller 201. FIG. 20 is a block diagram illustrating the field controller 201 in detail. In the figure, the circuit blocks and signal lines similar to those described with FIGS. 8 and 19 are denoted by the same reference numerals.

In the figure, reference numeral 210 denotes a synchronizer for generating, from the information of the compressed field bus 41 and the instruction address bus 64, information to be outputted to the instruction length signal line 68 and the write enable bus 43, and reference numeral 211 denotes a select signal generator for generating, from the information of the compressed field bus 41 and the write enable bus 43, select information to be outputted to select information lines 206 through 209. The address controller 61 is basically the same in function as the address controller 61 shown in FIG. 8.

The synchronizer 210 inputs sync bits 41a, c, e, and g from the compressed field bus 41. And, by inputting an instruction address from the instruction address bus 64, it can be known to which sync bit the instruction in execution corresponds. Further, by checking the change point of the sync bit, the length of the instruction can be known. Still further, the synchronizer identifies data in the above-mentioned compressed field bus in which the instruction exists and then outputs information for indicate the position in the instruction buffer 40 to which the data is written to the instruction length signal line 68.

The select signal generator 211 receives information of the write enable bus 43, 41a, c, e, and g of "SIMD" and "S mode" and address information from the compressed field bus 41. From these pieces of information, the select signal generator outputs four bits of positional information (information indicating one of the four bits 41a, c, e, and h) of the field 0 to the select information line 206. If the field 0 is NOP-compressed, all four bits go 0. This is, at the same time, provides the select information of the field 1 (information indicating one of the four bits 41b, d, f, and g). Likewise, the select signal generator outputs four bits of positional information (information indicating one of 41a, c, e, and h) of the field 2 to the select information line 207, four bits of positional information (information indicating one of 41a, c, e, and h) of the field 4 to the select information line 208, and four bits of positional information (information indicating one of 41a, c, e, and h) of the field 6 to the select information line 209. The following describes detailed operations of the synchronizer 210 and the select signal generator 211.

Figure 21:
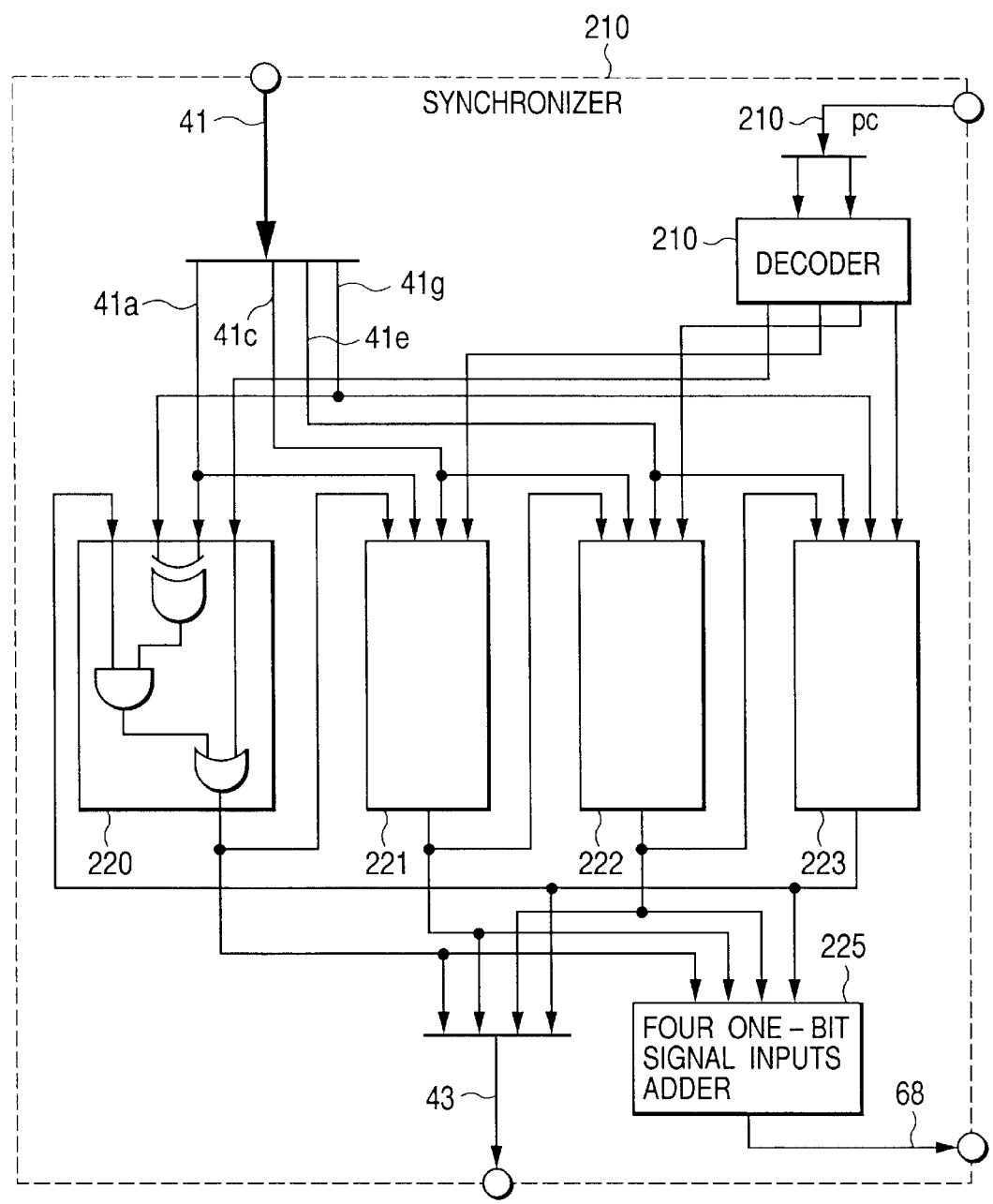
FIG. 21 is a block diagram illustrating a synchronizer 210 in detail.

FIG. 21 shows a block diagram illustrating the synchronizer 210 in detail. In the figure, the circuit blocks and signal lines similar to those previously described with FIG. 20 are denoted by the same reference numerals.

In the figure, reference numeral 220 denotes a write enable generation circuit for generating information for validating write operations to the 41a and b of the instruction buffer 40, reference numerals 221 through 223 denote write enable generation circuit, the same in function as the write enable generation circuit 220, for generating information for validating write operations to 41*c* and *d*, 41*e* and *f*, and 41*g* and *h* of the instruction buffer 40 respectively, and reference numeral 224 denotes a decoder for decoding two bits of IA4 and IA3 of the information of the instruction address bus 64. The four signal lines outputted from the decoder 224 indicate a signal indicating the 41*a* and 41*b* by the select signal generator 63, a signal indicating 41*c* and 41*d*, a signal indicating 41*e* and 41*f*, and a signal indicating 41*g* and 41*h*.

The write enable generation circuit 220 generates write validation information of the 41*a* and *b*. The write enable generation circuit receives sync information of the 41*a* and 41*g* from the compressed field bus 41, decode signals of the 41*a* and *b* from the decoder 223, and write validation information from the write enable generation circuit 223. When the decode signal from the decoder 224 is asserted, the write enable generation circuit 220 asserts the write validation information. If the decode signal is not asserted and the output of the write enable generation signal 223 is not asserted, the write enable generation signal 220 negates the write validation information. If the decode signal is not asserted and the write enable generation circuit 223 is asserted, the write enable generation circuit 220 compares the sync information of the 41*a* with the sync bit of 41*g*. If a match is found, the write enable generation circuit 220 determines that no distinction between instructions has been detected and asserts the write validation information. Conversely, if a mismatch is found, the write enable generation circuit 220 determines that a distinction between instructions has been found and negates the write validation information.

Thus, the write enable generation circuit 220 generates the write validation information of the 41*a* and *b*. This controls whether to perform a write operation to the instruction buffer 40 at transition to the next cycle. Likewise, the write enable generation circuit 221 generates write validation information of 41*c* and *d*, the write enable generation circuit 222 generates write validation information of 41*e* and *f*, and the write enable generation circuit 223 generates write validation information of 41*g* and *h* and output the generated pieces of information to the write enable bus 43. An adder 225 receives the four signals from the write enable generation circuits 220 through 223 and outputs a result of 4-input addition to the instruction length signal line 68. Since one bit is eight bytes (for two fields), the result of the addition is a maximum of 32 bytes. The result of the addition is outputted as instruction length information to the instruction length signal line 68.

Figure 22:
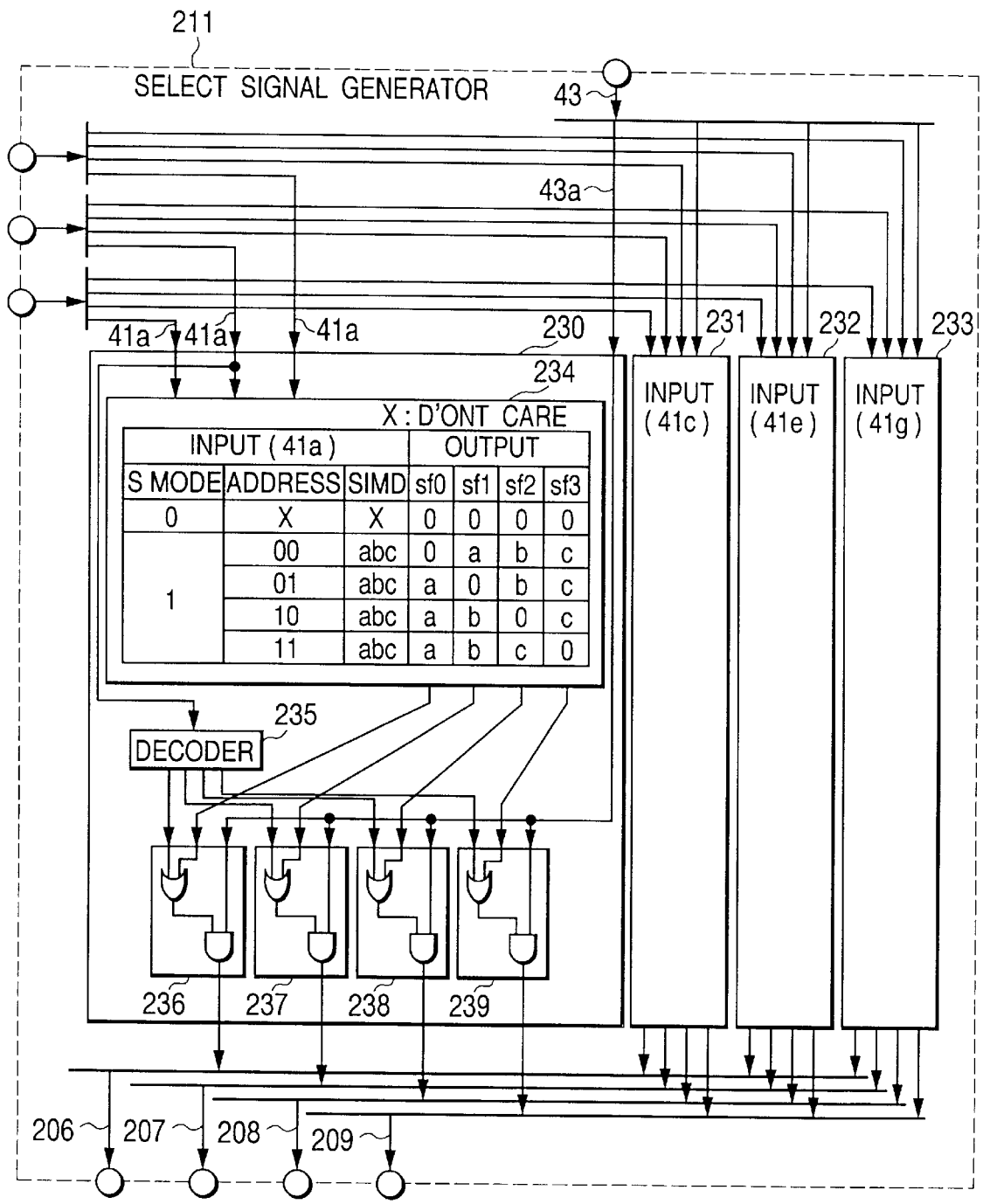
FIG. 22 is a block diagram illustrating a select signal generator 211 in detail.

The following describes the detailed operations of the select signal generator 211. FIG. 22 shows a block diagram illustrating the select signal generator 211 in detail. In the figure, the circuit blocks and signal lines similar to those previously described with FIG. 20 are denoted by the same reference numerals.

Reference numerals 230 through 233 denote destination signal generation circuits having the same function. In the destination signal generation circuit 230, reference numeral 234 denotes a combination circuit for implementing a truth table shown in the figure, reference numeral 235 denotes a 2-bit decoder, and reference numerals 236 through 239 denote logic circuits having the same function.

The destination signal generation circuit 230 determines to which field the 41*a* and *c* correspond. The logic circuit 236 indicates that the 41*a* and *c* correspond to the fields 0 and 1, the logic circuit 237 indicates that the 41*a* and *c* correspond to the fields 2 and 3, the logic circuit 238 indicates that the 41*a* and *c* correspond to the fields 4 and 5, and the logic circuit 239 indicates that the 41*a* and *c* correspond to the fields 6 and 7. Therefore, if the 41*a* and *b* correspond to the fields 0 and 1, the output of the logic circuit 236 is asserted; if 41*a* and *b* correspond to the fields 2 and 3, the output of the logic circuit 237 is asserted; if 41*a* and *b* correspond to the fields 4 and 5, the output of the logic circuit 238 is asserted; and if the 41*a* and *b* correspond to the fields 6 and 7, the output of the logic circuit 239 is asserted. If the instruction of the 41*a* specifies the SIMD mode, the destination signal generation circuit 230 asserts a plurality of signals simultaneously. For example, copy is made to all other three fields, the output signals of the logic circuits 236 through 239 are all asserted.

The destination signal generation circuit 230 receives "SIMD, "S-mode," and address of the 41*a* from the compressed field bus 41. From these pieces of input information, the combination circuit 234 generates output information sf0 through 3 according to the truth table shown in the figure. The sf0 through 3 are signals for specifying the copy destination field of 41*a* when the field of 41*a* specifies the S mode. In the figure, a, b, and c indicate a 3-bit logical value of "SIMD." Therefore, a, b, and c of the sf0 through 3 indicate that the logical value is outputted as it is. The sf0 is asserted when the 41*a* field specifies the SIMD mode and the field 0 is specified as copy destination. Likewise, the sf1 through 3 are asserted when the fields 2, 4, and 6 are asserted as copy destinations.

The decoder 235 decodes field address information and indicates which field the 41*a* is. If the 41*a* is the field 0, the output to the logic circuit 23 is asserted; if the 41*a* is the field 2, the output to the logic circuit 237 is asserted; if the 41*a* is the field 4, the output to the logic circuit 238 is asserted; and if the 41*a* is the field 6, the output to the logic circuit 239 is asserted.

Further, the destination signal generation circuit 230 receives the write validation information of the 43*a* from the write enable bus 43. That this information is asserted indicates that the 43*a* is the field of execution instruction. Therefore, if this signal is not asserted, the outputs of the logic circuits 236 through 239 are not all asserted. Conversely, if these outputs are asserted, the logic circuits connected to one signal line asserted among the output lines of the decoder 235 asserts the output signal. If the address is 00 (binary), the logic circuit 236 asserts the output signal; if the address is 01 (binary), the logic circuit 237 asserts the output signal; if the address is 10 (binary), the logic circuit 238 asserts the output signal; and if the address is 11 (binary), the logic circuit 239 asserts the output signal. For example, when the logic circuit 236 asserts the output signal and copy to fields 2 and 4 is specified in the SIMD mode, the destination signal generation circuit 230 asserts the signals to the logic circuits 237 and 238, so that the output signals of the logic circuits 236 and 237 are also asserted.

Thus, the destination signal generation circuit 230 determines to which instruction field the 41*a* corresponds and determines the copy destination field in the SIMD mode, and then specifies the destination field of the 41*a* to the dual selector 202 via the select information line 206. Likewise, by determining the copy destination field in the SIMD mode, the destination signal generation circuit 231 determines to which instruction field the 41*c* corresponds, the destination signal generation circuit 232 determines to which instruction field the 41*e* corresponds, and the destination signal generation circuit 233 determines to which instruction field the 41*g* corresponds and specify the destination field numbers of the field information of the 41*c*, 41*e*, and 41*g* to the dual selectors.

The output signal of the destination signal generation circuits 230 to 233 of which destination is the field 0 is outputted to the select signal line 206. Likewise, the output signal of the destination signal generation circuits 230 to 233 of which destination is the field 2 is outputted to the select signal line 207, the output signal of the destination signal generation circuits 230 to 233 of which destination is the field 4 is outputted to the select signal line 208, and the output signal of the destination signal generation circuits 230 to 233 of which destination is the field 6 is outputted to the select signal line 209. By use of these pieces of select information, the dual selectors 202 through 205 shown in FIG. 19 can select each field information from the information of the compressed field bus 41.

So far, the second embodiment of the present invention has been described. This embodiment features that, unlike the first embodiment, the SIMD mode is implemented without using the header information. This provides an advantage that, because the maximum instruction length is 32 bytes, an instruction to be executed next is guaranteed to be always ready in the instruction buffer 40 (32 bytes), so that the case in which one cycle otherwise required for making one instruction ready can be eliminated for easy pipeline control. To eliminate the above-mentioned excess one cycle in the first embodiment, a 64-byte buffer must be provided. In the second embodiment, however, requires no such a buffer, resulting in less hardware amount.

Figure 23:
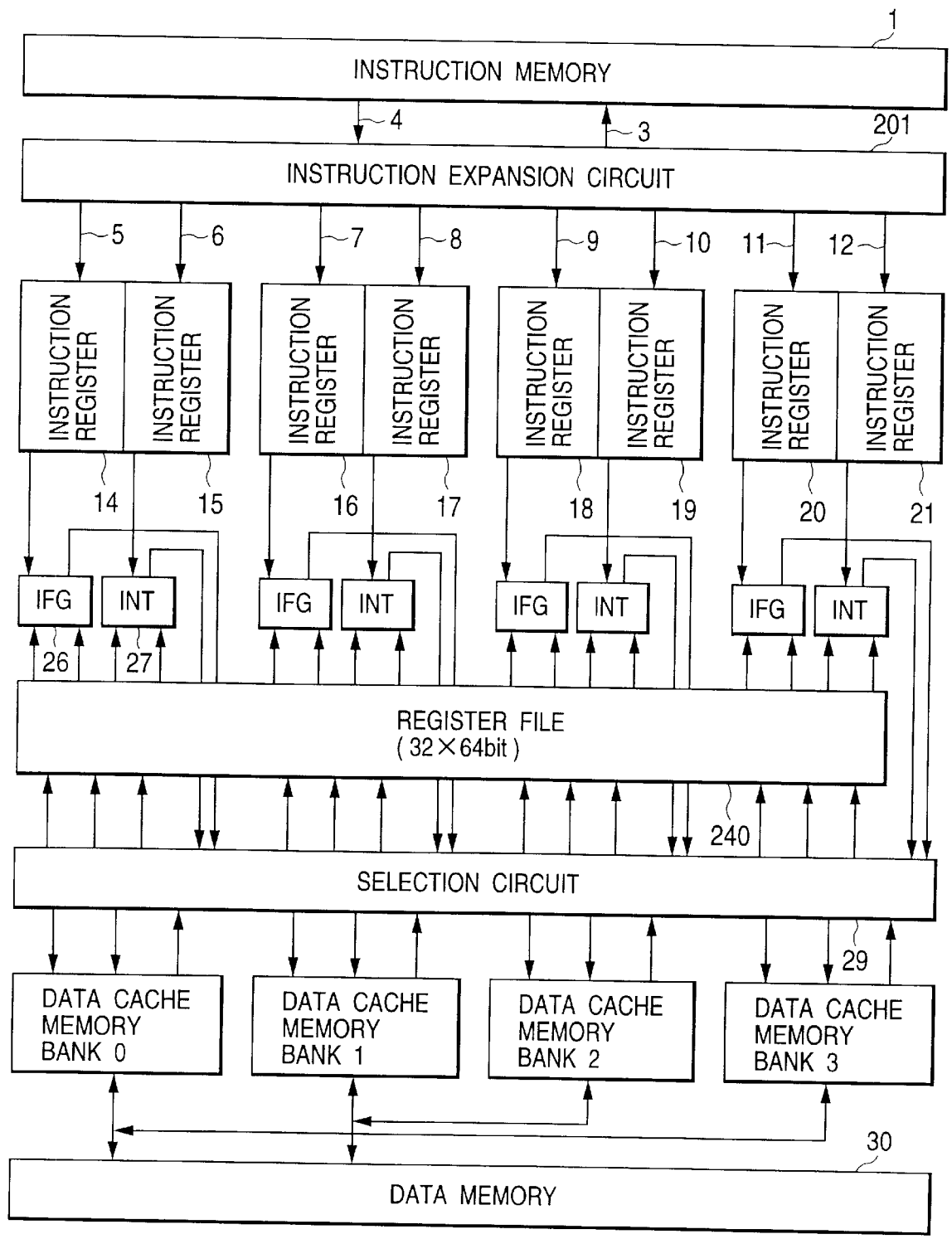
FIG. 23 is a block diagram illustrating a processor practiced as a third embodiment of the invention.

The following describes a third embodiment of the present invention with reference to FIG. 23. In the figure, the circuit blocks and signal lines similar to those previously described with FIG. 17 are denoted by the same reference numerals.

In the figure, reference numeral 240 denotes a register file common to all computing units, reference numeral 241 denotes an instruction expansion circuit unique to the present embodiment. The present embodiment features that the register file 240 is common to the computing units. In this case, the register specification methods are different in instruction format.

Figure 24:
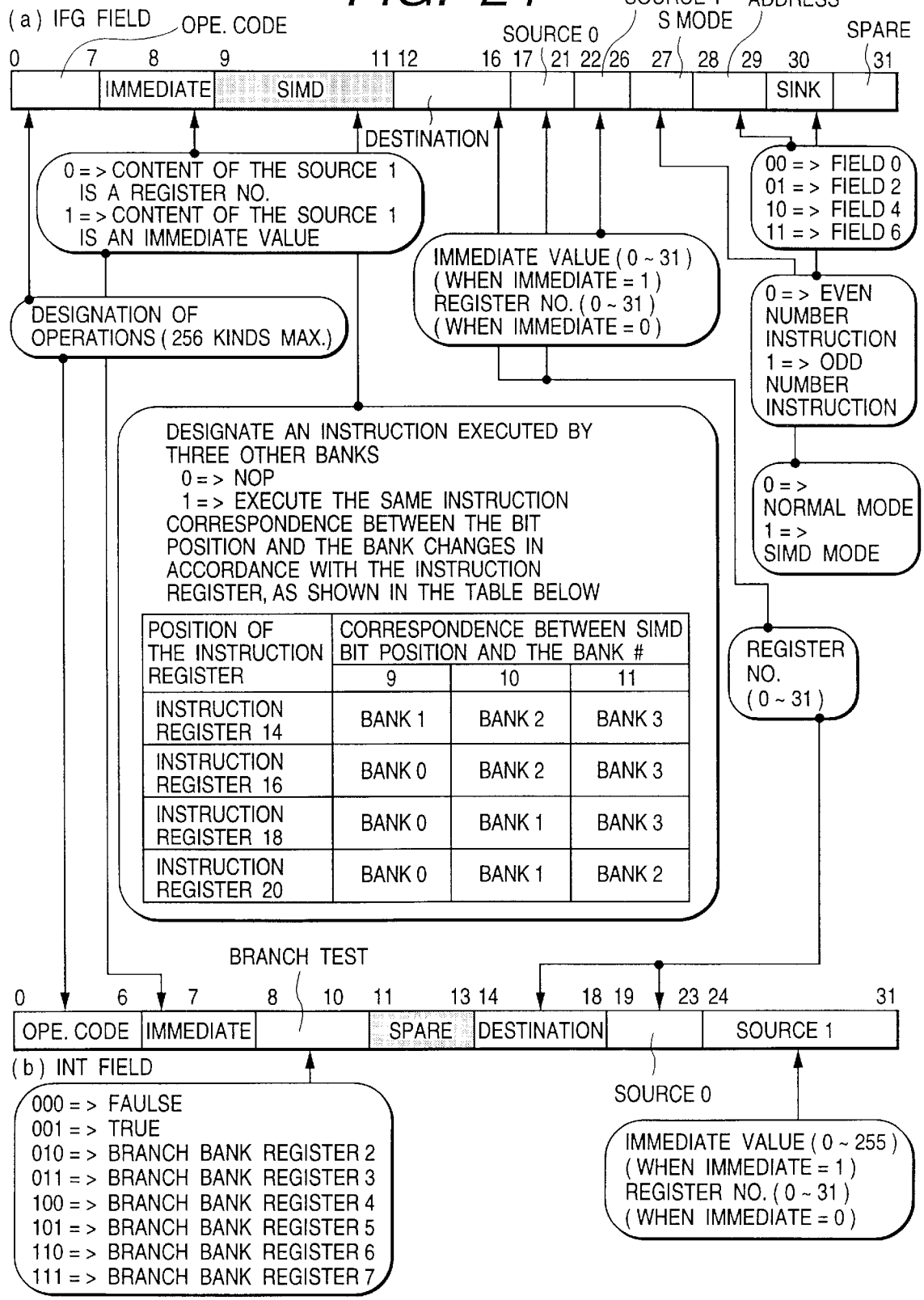
FIG. 24 is an instruction format indicating the third embodiment.

FIG. 24 shows a specific instruction format of the present embodiment. The instruction format shown in this figure is basically the same as that shown in FIG. 18. Differences are as follows. Because bank specification as destination is unnecessary, bits 9 through 11 of the IFG field are valid only in the SIMD mode and have no significance in the normal mode. Likewise, bits 11 through 13 of the INT field are invalid. In this case, a problem occurs in the SIMD mode. Namely, the register numbers specified by the fields physically indicate a same register, so that a register resource contention occurs. Hence, it is required to adjust the register numbers of the fields copied by the SIMD mode, thereby preventing the contention from occurring. This operation is performed by the instruction expansion circuit 241.

Figure 25:
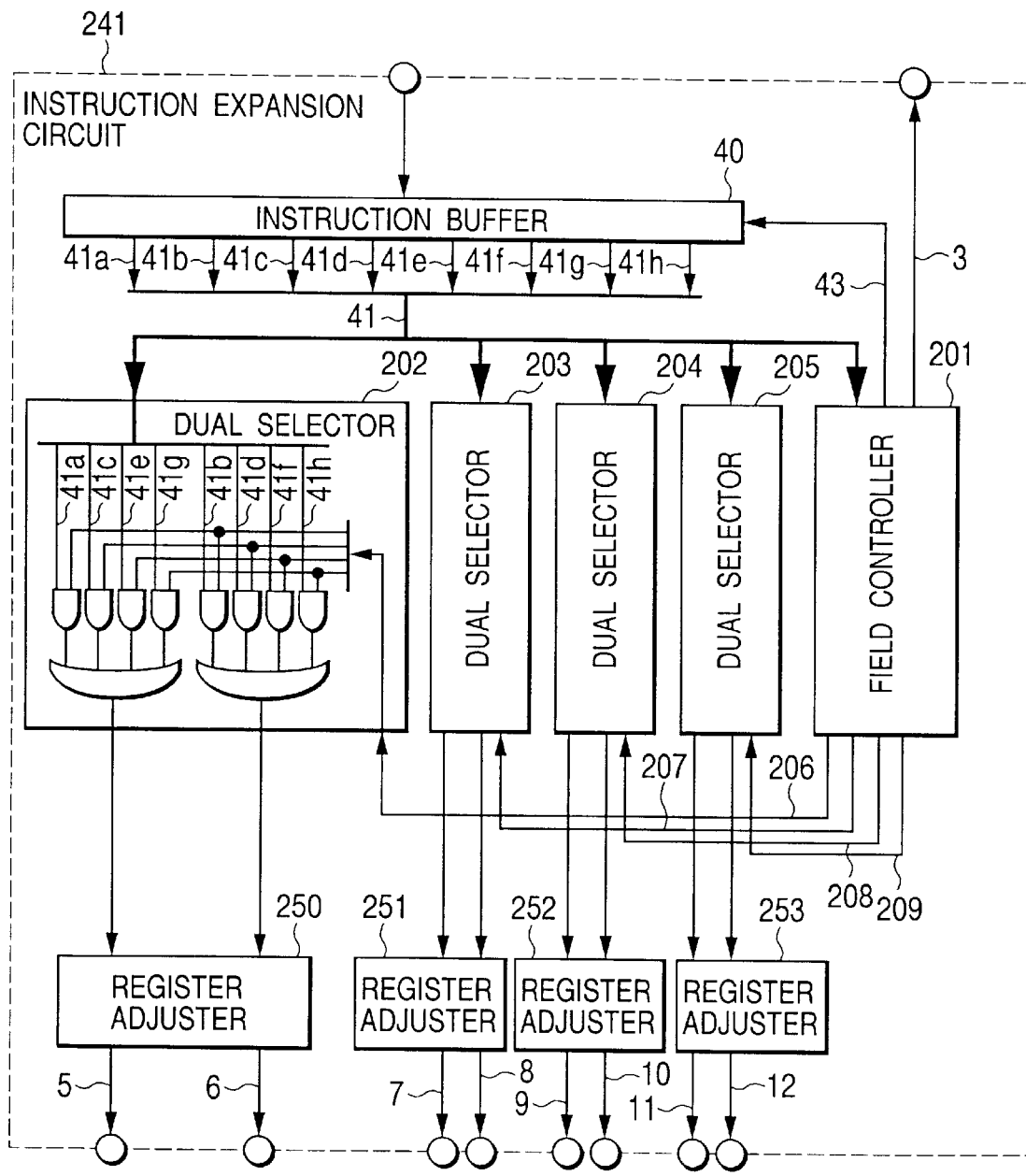
FIG. 25 is a block diagram illustrating an instruction expansion circuit 241 in detail.

FIG. 25 is a block diagram illustrating the instruction expansion circuit 241 in detail. In the figure, the circuit blocks and signal lines similar to those previously described with FIGS. 23 and 19 are denoted by the same reference numerals.

In the figure, reference numerals 250 through 253 denote register adjusters. The register adjuster 250 checks bit 27 of an inputted field. In the normal mode, no register number change in that field is performed. Conversely, in the SIMD mode, the register adjuster checks the addresses of bits 28 and 29. Consequently, if the address is the field 0, the field is the copy source field, performing no register number change. Conversely, if the address is other than the field 0, the field is the copy destination field, the register numbers (bits 12 through 16, bits 17 through 21, and bits 22 through 26) are updated. To be more specific, if the field is the field 3, offset value 1 is added to each register number; if the field is the field 2, offset value 2 is added to each register number; and if the field is the field 1, offset value 3 is added to each register number.

The register adjuster 251 operates likewise. The register adjuster 251 checks bit 27 of the inputted field. In the normal mode, no register number change in that field is performed. Conversely, in the SIMD mode, the register adjuster checks the addresses of bits 28 and 29. Consequently, if the address is the field 1, the field is the copy source field, performing no register number change. Conversely, if the address is other than the field 0, the field is the copy destination field, the register numbers (bits 12 through 16, bits 17 through 21, and bits 22 through 26) are updated. To be more specific, if the field is the field 0, offset value 1 is added to each register number; if the field is the field 3, offset value 2 is added to each register number; and if the field is the field 2, offset value 3 is added to each register number. The register adjusters 252 and 253 operate in generally the same manner. These register adjusters 250 through 253 can be implemented by a combined circuit for performing the above-mentioned operations.

FIG. 26 shows a truth table for implementing the combined circuit. In the figure, the S mode in the input field indicates bit 27, the address indicates bits 28 and 29, and the register # indicates bits 12 through 16, 17 through 21, and 22 through 26 of input values (0 through 31). The register # in the output field indicates bits 12 through 16, 17 through 21, and 22 through 26 of output values. Especially, if the output register # exceeds 31, a value obtained by subtracting 32 is used.

As described, the present invention is also applicable to a processor in which a register file is shared by a plurality of computing devices.

It should be noted that the instruction formats used in the above-mentioned embodiments are illustrative purposes only and hence other formats may be used.

The above-mentioned embodiments 1, 2, and 3 are applied to a VLIW processor that presupposes static scheduling, but the present invention is not necessarily limited thereto. For example, the present invention is also applicable to a superscalar processor that performs dynamic scheduling. On instruction in the superscalar processor is basically constituted by a fixed length of one field as described in the preceding embodiment. Such a processor incorporates a plurality of computing units and an instruction queues and has a dispatcher that checks the dependent relationship between the plurality of queued instructions and, if no dependency is found and a plurality of executable instructions are found, transfers these instructions to the plurality of computing units simultaneously. Therefore, as shown in FIG. 2 of the present invention, if the SIMD mode is specified in the instruction format by "S-mode" and "SIMD," the above-mentioned dispatch unit transfers that instruction to the plurality of computing units, easily implementing the SIMD mode of the superscalar processor.

Figure 27:
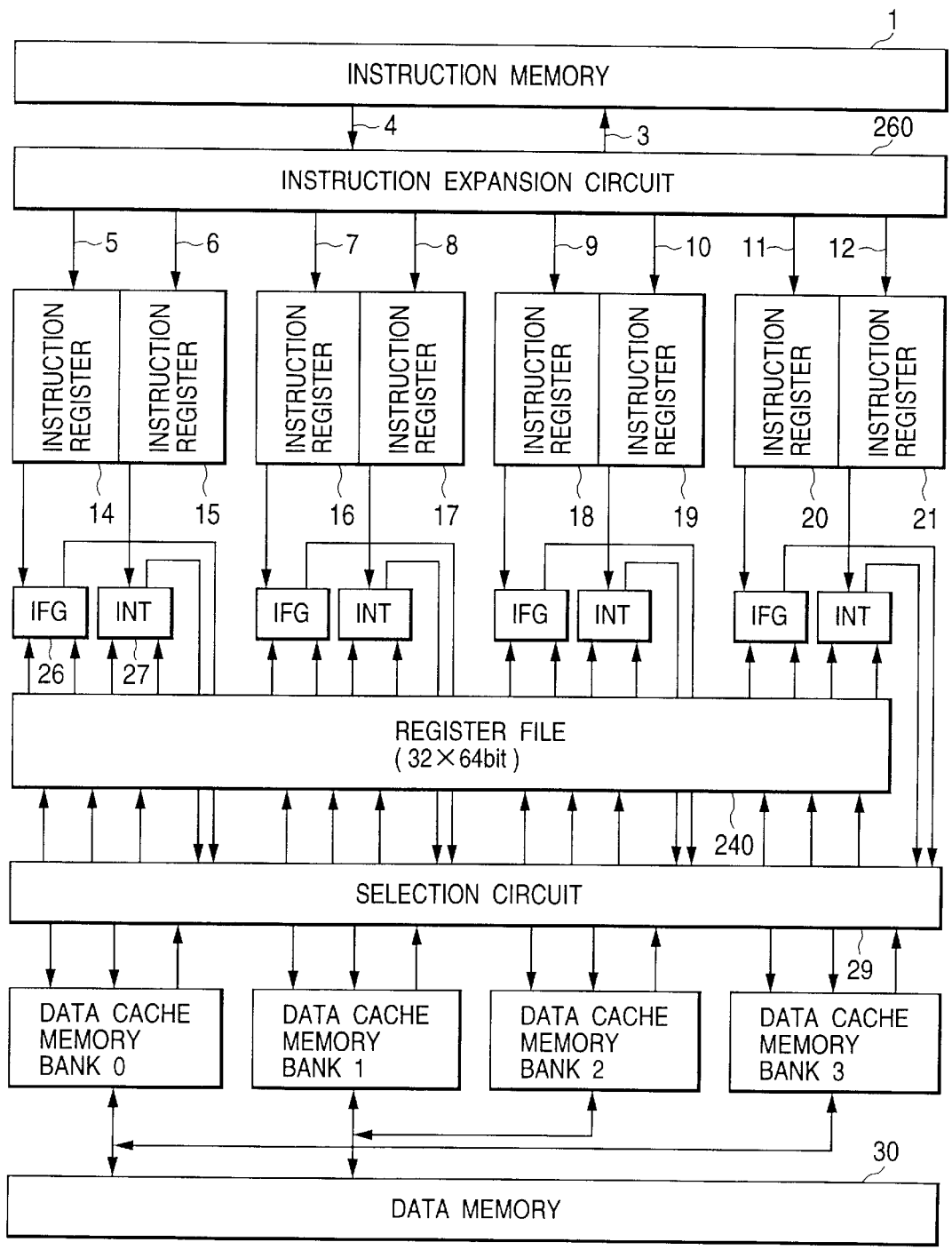
FIG. 27 is a block diagram illustrating a processor practiced as a fourth embodiment of the invention.

FIG. 27 shows a specific overall block diagram. In the figure, the circuit blocks and signal lines similar to those previously described with FIG. 23 are denoted by the same reference numerals. In the figure, reference numeral 260 denotes an instruction expansion circuit corresponding to superscalar architecture.

Figure 28:
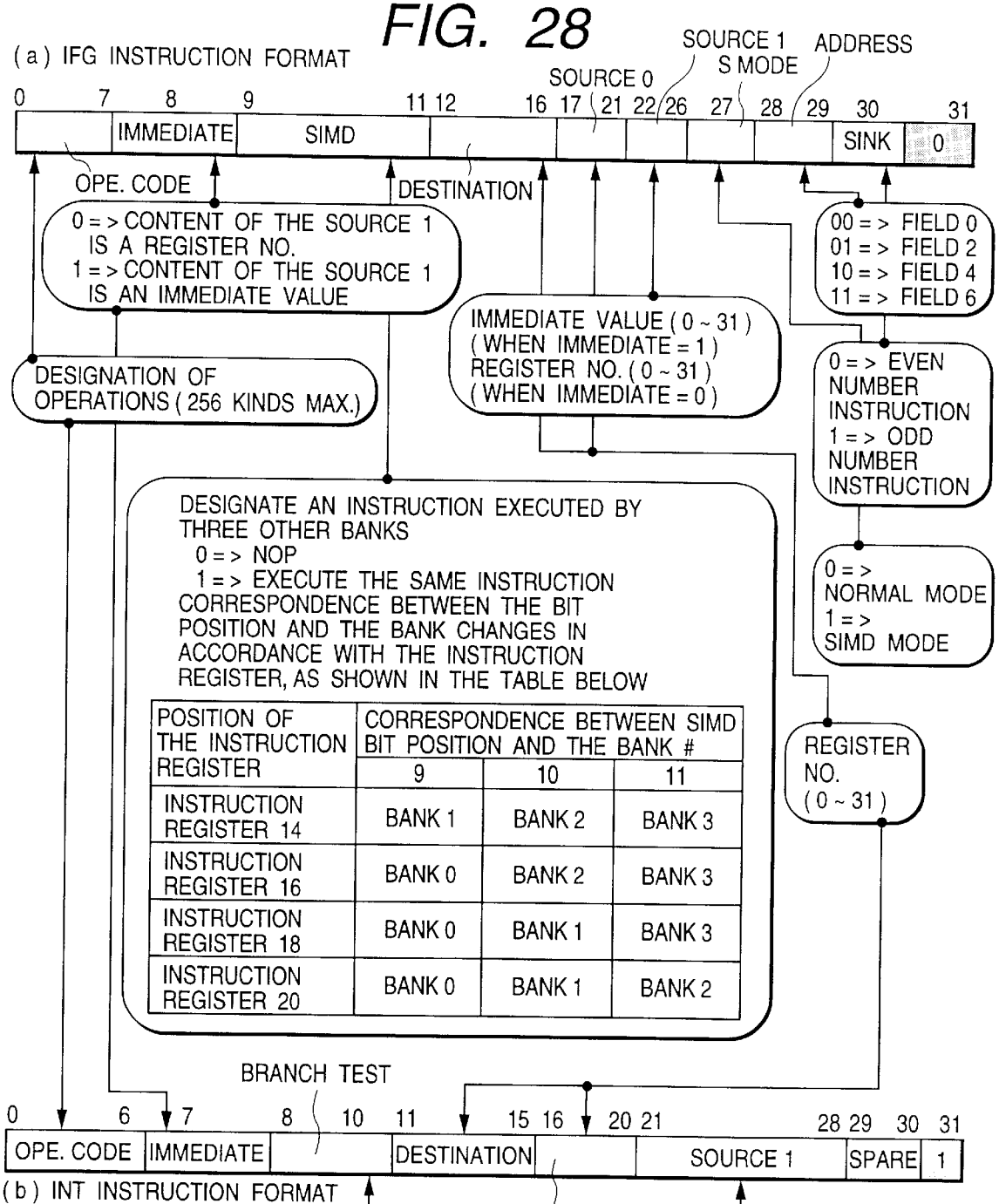
FIG. 28 is a diagram illustrating an instruction format indicating the fourth embodiment.

FIG. 28 shows the instruction formed used in the present embodiment. As shown, the IFG field and the INT field constitute one instruction each. Therefore, because it needs to be known to which format an instruction belongs, the IFG format is indicated when bit 31 is 0 and the INT format is indicated when bit 31 is 1. The subsequent bits have the same means as those of FIG. 24. However, "destination," "source 0," "source 1," and the spare block in the INT instruction have different bit positions. Therefore, the instruction expansion circuit 260 extracts a plurality of instructions simultaneously executable and inputs the extracted instructions into the computing units.

Figure 29:
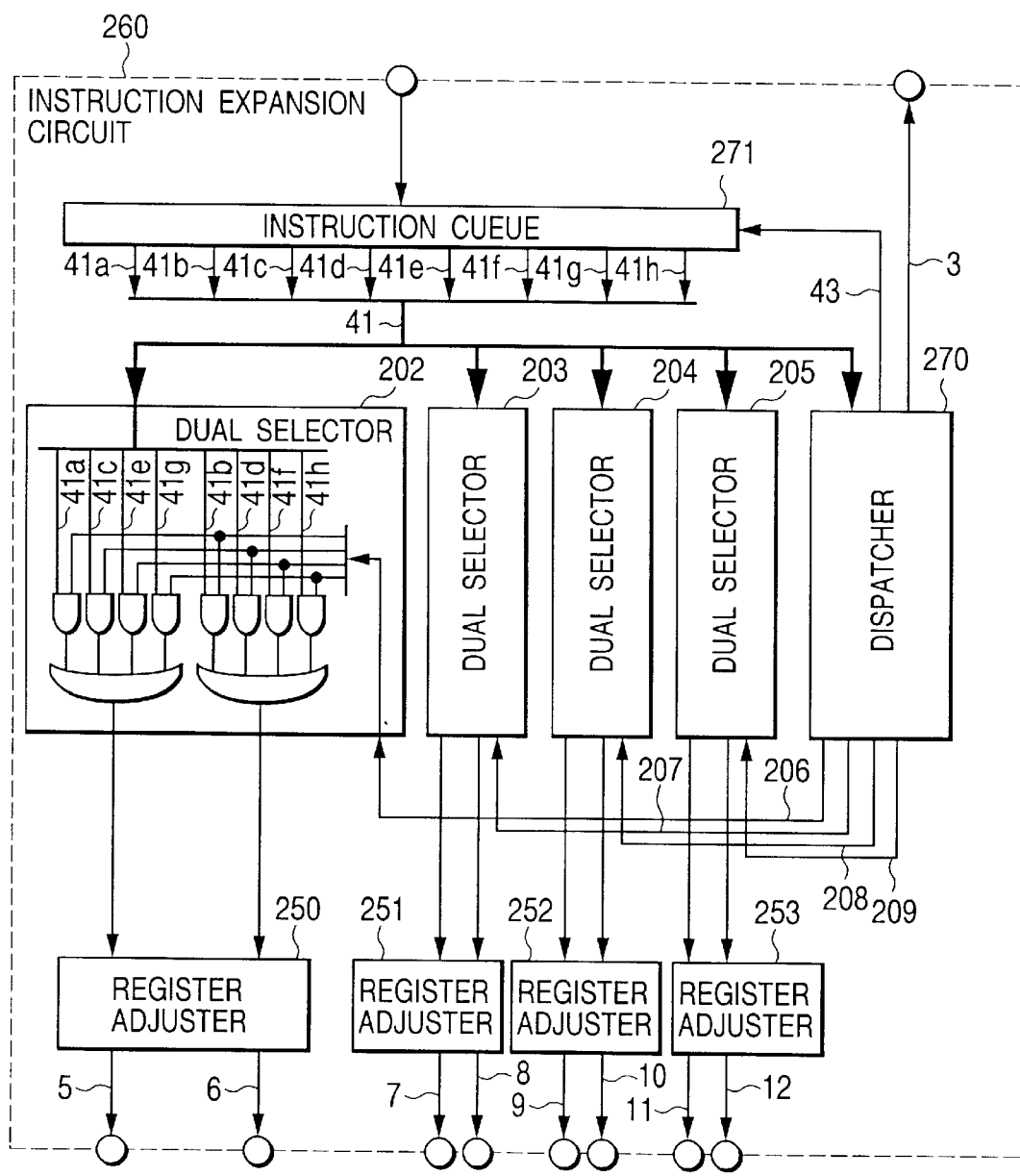
FIG. 29 is a block diagram illustrating an instruction expansion circuit 260 in detail.

FIG. 29 shows a detailed constitution of the instruction expansion circuit 260. In the figure, the circuit blocks and signal lines similar to those previously described with FIGS. 27 and 25 are denoted by the same reference numerals.

In the figure, reference numeral 270 denotes a dispatcher for performing instruction scheduling and controlling the input of the scheduled instructions into the computing devices and reference numeral 271 denotes an instruction queue. In the figure, the instruction queue 271 can store a maximum of eight instructions. Through the compressed field buses 41*a* through 41*h*, the dispatcher 270 can know all these instructions.

The dispatcher 270 analyzes the contents of each instruction field to check dependency between the resources internal to the processor. As a result, the dispatcher determines a plurality of instructions independent of each other and transfers the data for inputting these instructions to the appropriate computing units to the dual selector 202 through 205. On the other hand, the write enable bus 43 notifies the instruction queue 271 of which instruction in the instruction queue 271 has been executed and, at the same time, via the address bus 3, outputs the address information containing an instruction code held in the instruction queue 271 to the address bus 3. For example, if three instructions 41*a* through 41*c* have been executed, the instruction queue 271 transfers five instructions 41*d* through 41*h* to the positions of 41 *a* through 41*e* and, at the same time, latches the three instructions transferred according to the information of the address bus 3 to 41*f* through 41*h*.

In the superscalar processor having the above-mentioned constitution, it can be easily implemented when the constitution of the field controller 201 shown in FIG. 19 is referenced that the dispatcher 270 analyzes "SIMD" and inputs one instruction into a plurality of computing units.

Although the above-mentioned superscalar processor performs dynamic scheduling, the compiler actually sorts (loop expansion for example) the instructions for providing parallelism. This increases the object code size, so that the present invention, which is capable of executing a plurality of instructions by one instruction, is also effective in reducing the code size of the superscalar processor.

In the present invention, with the embodiment of FIG. 1, it is presupposed that the computing units 22 through 25 are completely the same in function. But the present invention is not limited thereto. For example, instructions operable in the SIMD mode may be restricted. To be specific, if the computing units 22 through 25 make only the instruction set for the computation valid to multimedia correspond to the SIMD mode and not to a branch instruction, the computing units 22 through 25 may not be completely the same in function. The advantage in this case is that the number of operations that each computing unit supports can be increased.

For example, in the IFG field shown in FIG. 2, 256 instructions can be executed by the 8-bit "ope code" and 1-bit "S mode" and the SIMD mode can be specified for each of these instructions. If the number of instructions operable in the SIMD mode is limited to 128, the computing units 22 through 25 can support up to 384 instructions. Namely, because 128 instructions, a half of the instructions to be specified by an 8-bit "ope code" do not specify the SIMD mode, "S mode" of one bit becomes usable as a part of the "ope code," resulting in supporting 256 instructions that do not correspond to the SIMD mode.

Further, because the present invention uses the SIMD mode, the computing units 22 through 25 shown in FIG. 1 have the same function. This constitution provides the following advantages in addition to the use of the SIMD mode.

First, the number of processor development steps can be reduced. Namely, by copying the circuit of the computing unit 22, the circuits of the computing units 23 through 25 can be developed. That is, the number of development steps for circuit scale 25% of the conventional development.

Second, the availability of each computing unit can be enhanced. The key factor is that the IFG computing device in each computing unit is compatible with a plurality of uses such as numeric computation instruction and multimedia processing instruction. This constitution allows the capability of the IFG computing devices to be fully available for various applications by executing numeric computation instructions by applications requiring numeric computation by the IFG computing devices of the four computing units 22 through 25 and by executing multimedia processing instructions for applications requiring multimedia processing by the IFG computing devices of the four computing units.

The following describes an example of the constitution of the IFG computing device that is the key factor of the invention. To be specific, the following describes a method of constituting the IFG computing device that can execute a 32×32-bit multiplication instruction for use in numeric computation and a division instruction for concurrently executing 16 8×8-bit computational operations on 128-bit data for use in multimedia. Normally, a result of 32×32-bit multiplication is obtained by dividing the data into four 8-bit parts, dividing the operation into 16 8×8-bit multiplying operations, and obtaining a sum of the results of these operations. Therefore, 16 8-bit multipliers are required. With respect thereto, the 8-bit multiplication often used in multimedia processing can be executed in 16 operations concurrently. Consequently, the IFG computing device can be implemented compatible with various applications while sharing most circuits. The detailed constitution of the IFG computing device will be described below with reference to FIG. 30.

Figure 30:
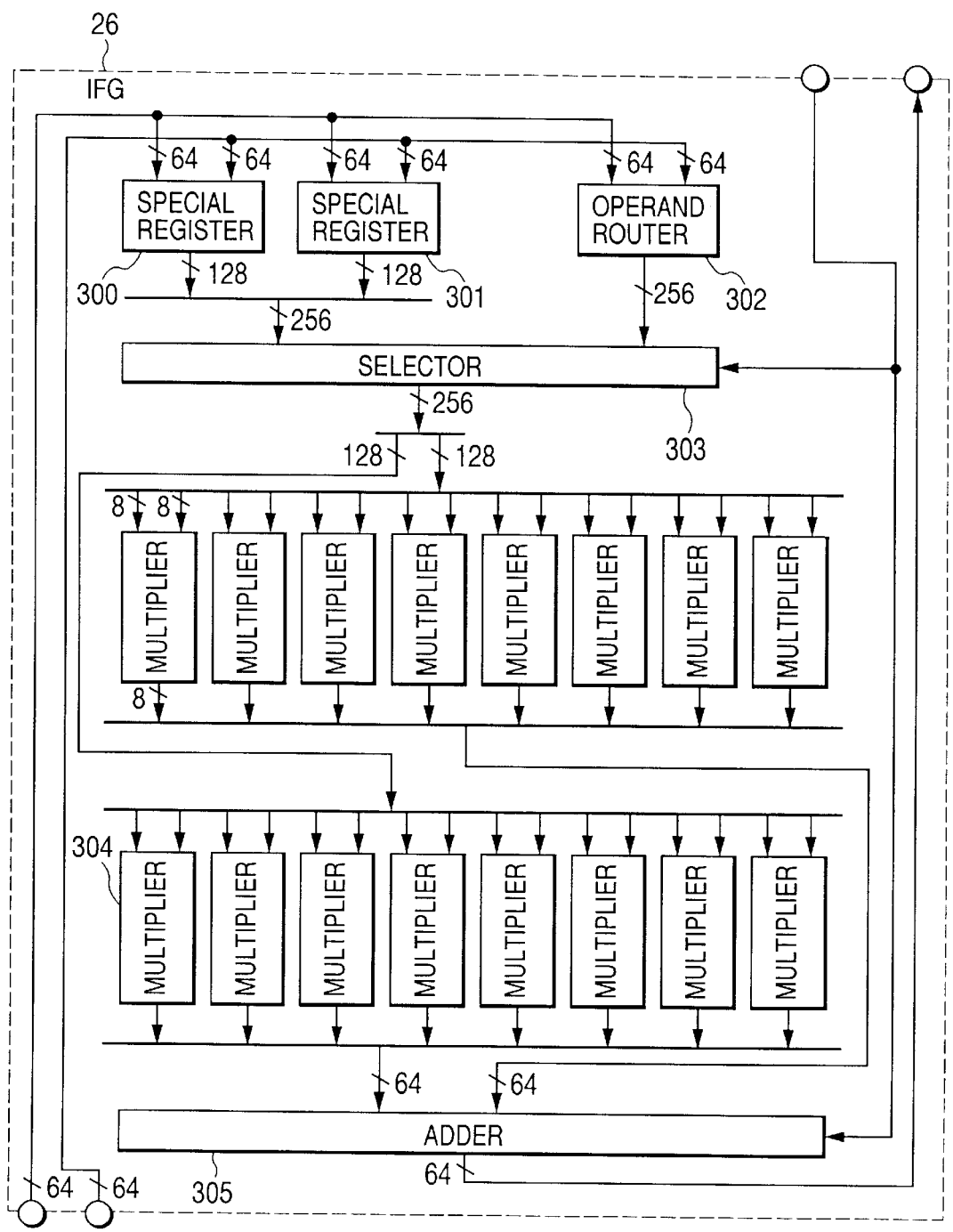
FIG. 30 is a constitutional diagram illustrating one embodiment of an IFG computing unit associated with the invention.

With reference to FIG. 30, the circuit blocks and signal lines similar to those previously described with FIG. 1 are denoted by the same reference numerals.

In the figure, reference numerals 300 and 301 denote 128-bit registers for holding an operand of a divided multiplication instruction for use in multimedia, reference numeral 302 denotes an operand router for distributing data for 32-bit multiplication on an 8-bit basis, reference numeral 303 denotes a 256-bit 2-input selector, reference numeral 304 denotes an 8-bit multiplier, and reference numeral 305 denotes an adder for adding multiplication results.

First, the operation of the divided multiplication instruction will be described. The divided multiplication instruction performs computation of $(a0 \times b0 + a1 \times b1 + a2 \times b2 + a3 \times b3 + a4 \times b4 + a5 \times b5 + a6 \times b6 + \ldots + a15 \times b15)$ on 16 pieces of 8-bit data (a0 through a15) stored in the register 300 and 16 pieces of 8-bit data (b0 through b15) stored in the register 301. For this computation, the data is set to the registers 300 and 301 before executing this multiplication instruction.

When this instruction is executed, the selector 303 selects the data of the registers 300 and 301 and outputs the selected data to each multiplier. The multiplier 304 calculates the term of a0×b0. Likewise, the remaining 15 multipliers calculates a1×b1, a2×b2, a3×b3 . . . , a15×b15 respectively. The results of these multiplying operations are sent to the adder 305. While this instruction is executed, the adder 305 outputs a result of summing 16 multiplication results.

On the other hand, in the 32-bit×32-bit multiplication instruction, the data is divided into four pieces of 8-bit data (a0 through a3 and b0 through b3) and the multiplication is divided into 16 8-bit multiplying operations.

$$(c0=a0{\times}b0,\ c1=a0{\times}b1,\ c2=a0{\times}b2,\ c3=a0{\times}b3,\ c4=a1{\times}b0,\ c5=a1{\times}b1,\ c6=a1{\times}b2,\ c7=a1{\times}b3,\ c8=a2{\times}b0,\ c9=a2{\times}b1,\ c10=a2{\times}b2,\ c11=a2{\times}b3,\ c12=a3{\times}b0,\ c13=a3{\times}b1,\ c14=a3{\times}b2,\ c15=a3{\times}b3)$$

In order to enable these 16 8-bit multiplying operations, the operand router 302 outputs operand data to be supplied to each multiplier.

At execution of the multiplication instruction, the selector 303 selects the output of the operand router 302 and outputs the selected data to each 8-bit multiplier. Further, the multiplication results are sent to the adder 305. The adder 305 adds the above-mentioned 16 multiplication results as follows.

$$(c0+(c1+c4){\times}16+(c2+c5+c8){\times}16^2+(c3+c6+c9+c12){\times}16^3+(c7+c10+c13){\times}16^4+(c11+c14){\times}16^5+c15{\times}16^6)$$

The result of the above-mentioned calculation is outputted as a 32-bit×32-bit multiplication result.

As described, the 16 8-bit multipliers occupying most of the circuitry can be shared by normal multiplication instructions and divided multiplication instructions. Arranging a plurality of computing units constituted by the above-mentioned computing devices makes the processor compatible with various applications, thereby implementing a VLIW processor with enhanced availability of each of the computing units constituting the processor.

INDUSTRIAL APPLICABILITY

As described and according to the present invention, the amount of instruction codes for the parallel processors that repetitively execute similar computations as with multimedia processing can be effectively reduced. Further, since the present invention has a constitution in which a plurality of computing units having the same function are arranged, the number of computing unit design steps can be reduced and, at the same time, the parallelism can be achieved only by increasing the number of computing units, thereby simply implementing the hardware.

Moreover, when considering multimedia processing such as image processing, a program structure can be designed in which the area of an image to be processed can be divided and the processing of each divided area is assigned to each execution unit. Consequently, the program developed for one execution unit can also be used for the other three execution units, thereby reducing the number of software development steps.

In addition, the present invention is applicable to processors of various architectures such as VLIW and superscalar.

What is claimed is:

1. A processor, comprising:

a memory for storing an instruction code;

an instruction code holding means for holding the instruction code read from said memory; and a plurality of computing units with the same capabilities regarding basic functions, having at least one computing device and a special register being connected to each computing unit, said computing device being controlled by information held in said instruction code holding means, and said each computing unit further having a register file for storing operand information of said computing device;

wherein said instruction code indicates a plurality of fields corresponding to the number of computing units, operating a plurality of said computing units, said computing device having the same basic functions, and said special register for holding a data type having a bit width too large to specify by a register in said register file, thereby allowing computational processing of both a register in said register file, and the data type stored in said special register.

2. A processor, comprising:

a memory for storing an instruction code made up of a plurality of fields corresponding to a number of computing units;

an instruction code holding means for holding an instruction code read from said memory; and a plurality of computing units including at least one computing device having a function the same as another computing device to be controlled by information held in said instruction code holding means;

a register file for storing operand information of said computing device; and a special register for holding a data type having a bit width too large to specify by a register in said register file, wherein said plurality of computing units can execute computational processing both of a data type having a bit width specifiable by the register in said register file and of the data type stored in said special register.

* * * * *

UNITED STATES PATENT AND TRADEMARK OFFICE
CERTIFICATE OF CORRECTION

PATENT NO. : 6,401,190 B1
DATED : June 4, 2002
INVENTOR(S) : Nishioka et al.

It is certified that error appears in the above-identified patent and that said Letters Patent is hereby corrected as shown below:

<u>Column 23,</u>
Line 16, change "through" to -- through 25 --

<u>Column 24,</u>
Line 55, change "on" to -- On --

Signed and Sealed this

Fifteenth Day of July, 2003

JAMES E. ROGAN
*Director of the United States Patent and Trademark Office*